US012210678B2

(12) United States Patent
Qiao et al.

(10) Patent No.: US 12,210,678 B2
(45) Date of Patent: Jan. 28, 2025

(54) DIRECTING A VIRTUAL AGENT BASED ON EYE BEHAVIOR OF A USER

(71) Applicant: Apple Inc., Cupertino, CA (US)

(72) Inventors: Mu Qiao, Campbell, CA (US); Dan Feng, Santa Clara, CA (US); Bo Morgan, Emerald Hills, CA (US); Mark E. Drummond, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/381,472

(22) Filed: Oct. 18, 2023

(65) Prior Publication Data

US 2024/0045501 A1 Feb. 8, 2024

Related U.S. Application Data

(63) Continuation of application No. 17/848,818, filed on Jun. 24, 2022, now Pat. No. 11,822,716.

(Continued)

(51) Int. Cl.
*G06F 3/01* (2006.01)
*G02B 27/01* (2006.01)

(52) U.S. Cl.
CPC ........... *G06F 3/013* (2013.01); *G02B 27/017* (2013.01); *G02B 2027/0138* (2013.01); *G02B 2027/0178* (2013.01)

(58) Field of Classification Search
CPC .......... G02B 27/017; G02B 2027/0138; G02B 2027/0178; G06F 3/011; G06F 3/013; G06T 13/40
See application file for complete search history.

(56) References Cited

U.S. PATENT DOCUMENTS 10,325,396 B2   6/2019   Grant
10,608,965 B2   3/2020   Dey et al.
(Continued)

FOREIGN PATENT DOCUMENTS

JP   2018007828 A   1/2018

OTHER PUBLICATIONS

Great Britain Combined Search and Examination Report under Sections 17 and 18(3) dated Oct. 21, 2022, GB Application No. GB2209562.4, pp. 1-6.

(Continued)

*Primary Examiner* — Nelson M Rosario
(74) *Attorney, Agent, or Firm* — Fernando & Partners, LLP

(57) ABSTRACT

According to various implementations, a method is performed at an electronic device including one or more processors, a non-transitory memory, and a display. The method includes displaying, on the display, a virtual agent that is associated with a first viewing frustum. The first viewing frustum includes a user avatar associated with a user, and the user avatar includes a visual representation of one or more eyes. The method includes, while displaying the virtual agent associated with the first viewing frustum, obtaining eye tracking data that is indicative of eye behavior associated with an eye of the user, updating the visual representation of one or more eyes based on the eye behavior, and directing the virtual agent to perform an action based on the updating and scene information associated with the electronic device.

20 Claims, 23 Drawing Sheets

Related U.S. Application Data

(60) Provisional application No. 63/225,901, filed on Jul. 26, 2021.

(56) References Cited

U.S. PATENT DOCUMENTS

| | | | |
|---|---|---|---|
| 10,664,741 B2 | 5/2020 | Gibbs et al. | |
| 2019/0079597 A1 | 3/2019 | Kada et al. | |
| 2019/0130599 A1 | 5/2019 | Gebbie et al. | |
| 2019/0188895 A1 | 6/2019 | Miller, IV et al. | |
| 2019/0266775 A1 | 8/2019 | Lee et al. | |
| 2020/0376369 A1 | 12/2020 | Reddan et al. | |
| 2021/0104100 A1* | 4/2021 | Whitney | G02B 27/0093 |
| 2021/0312684 A1* | 10/2021 | Zimmermann | G02B 27/01 |

OTHER PUBLICATIONS

Rebekah Carter, "Microsoft Hololens 2 Delivers New Eye Tracking," Jan. 27, 2021, Retrieved from the Internet: https://www.xrtoday.com/mixed-reality/microsoft-hololens-2-delivers-new-eye-tracking/, pp. 1-3.

* cited by examiner

DIRECTING A VIRTUAL AGENT BASED ON EYE BEHAVIOR OF A USER

CROSS-REFERENCE TO RELATED APPLICATIONS

This application is a continuation of U.S. Non-Provisional patent application Ser. No. 17/848,818, filed on Jun. 24, 2022, which claims priority to U.S. Provisional Patent App. No. 63/225,901, filed on Jul. 26, 2021, and hereby incorporated by reference in their entireties.

TECHNICAL FIELD

The present disclosure relates to display of a virtual agent, and in particular controlling the virtual agent based on eye behavior of a user.

BACKGROUND

In various situations, a device displays a virtual agent, and a user of the device interacts with the virtual agent by providing a user input to the device. However, the user interaction is often cumbersome, such as when a hand of the user moves across an environment towards a virtual agent in order to select or manipulate the virtual agent. Accordingly, the user interaction may result in user discomfort, resulting in the device receiving inaccurate user inputs and degrading the user experience as a whole. Moreover, the device lacks a mechanism for enabling the user to intuitively interact with the virtual agent.

SUMMARY

In accordance with some implementations, a method is performed at an electronic device with one or more processors, a non-transitory memory, and a display. The method includes displaying, on the display, a virtual agent that is associated with a first viewing frustum. The first viewing frustum includes a user avatar associated with a user, and the user avatar includes a visual representation of one or more eyes. The method includes, while displaying the virtual agent associated with the first viewing frustum, obtaining eye tracking data that is indicative of eye behavior associated with an eye of the user, updating the visual representation of the one or more eyes based on the eye behavior, and directing the virtual agent to perform an action based on the updating and scene information associated with the electronic device.

In accordance with some implementations, an electronic device includes one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
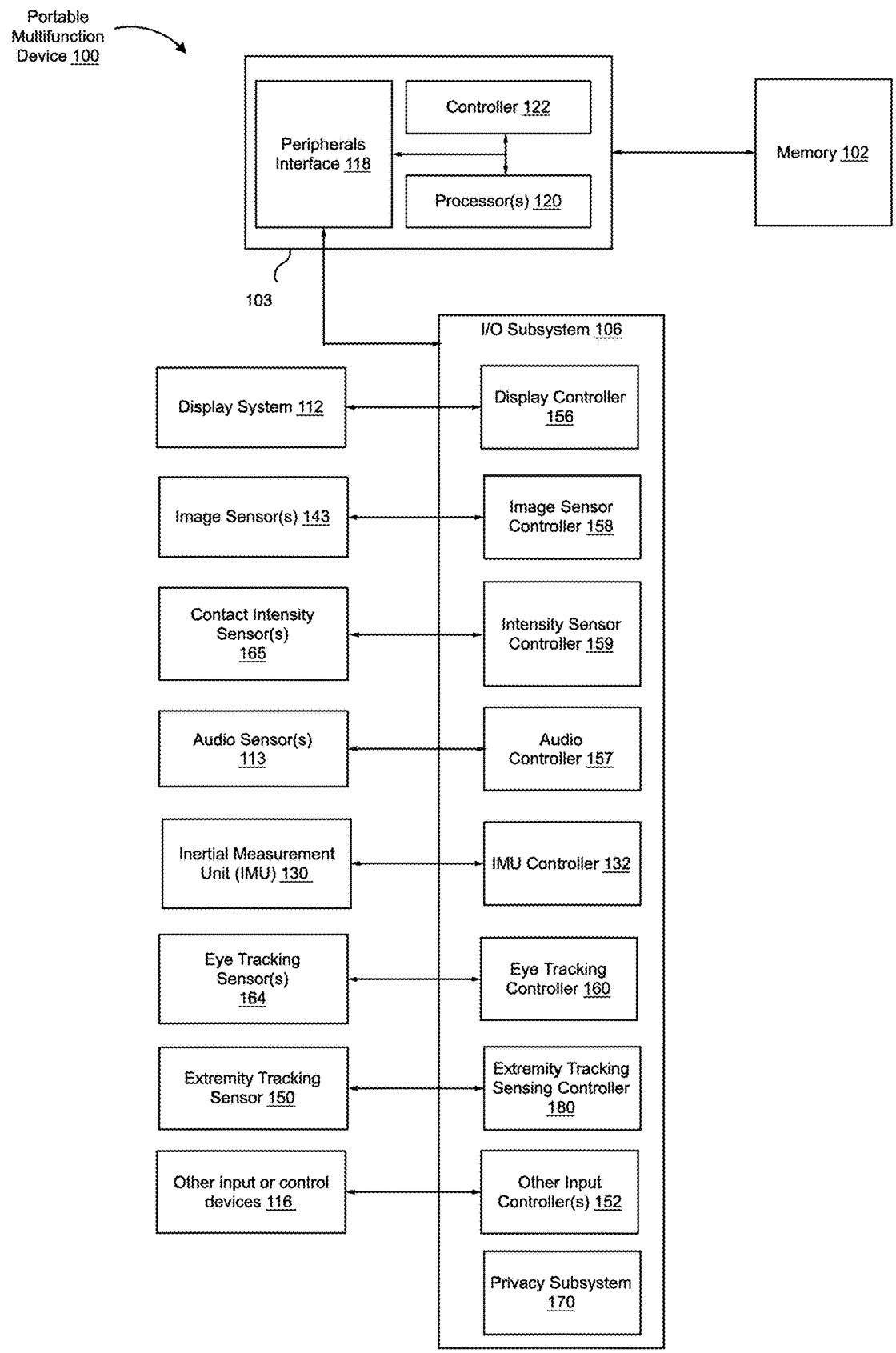
FIG. 1 is a block diagram of an example of a portable multifunction device in accordance with some implementations.

In various situations, a device displays a virtual agent, and a user of the device interacts with the virtual agent by providing a user input to the device. For example, the device includes an extremity tracker that tracks movement of a hand of the user, and the device manipulates display of the virtual agent based on the tracking. However, the user interaction is often cumbersome, such as when the hand of the user moves through an environment towards the virtual agent. Accordingly, the user interaction may result in user discomfort, physical or otherwise, such as fatigue of the hand of the user. User discomfort often results in the user providing inaccurate (e.g., unintended) inputs to the device, resulting in a manipulation (or lack thereof) of the virtual agent that does not reflect the user's intentions.

By contrast, various implementations disclosed herein include methods, systems, and electronic devices for directing a virtual agent to perform an action based on eye behavior of a user (e.g., eye movement) and scene information. To that end, an electronic device may include an eye tracker that obtains eye tracking data indicative of the eye behavior of the user. For example, the eye behavior indicates a focus position or an eye pattern, such as a saccade or microsaccade movement. As one example, an electronic device determines that a focus position (e.g., gaze) of a user is directed to a particular object, and in response the electronic device directs a virtual agent to move towards the particular object or directs the virtual agent to move its own gaze to the particular object. The action may include changing an appearance of one or more virtual eyes of the virtual agent, moving the body or head of the virtual agent, emitting a sound from the virtual agent, etc. For example, the eye behavior includes a change from a first focus position to a second focus position. Accordingly, the electronic device directs virtual eyes of the virtual agent to change to a focus position that is less than a threshold distance from the second focus position. Examples of the scene information include environment type (e.g., virtual reality (VR) environment, augmented reality (AR) environment, mixed reality (MR) environment), scene ambience (e.g., a dark and quiet room), information regarding objects within the scene, scene location (e.g., outdoors versus indoors), and/or the like.

Description

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to ahead-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s) 143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
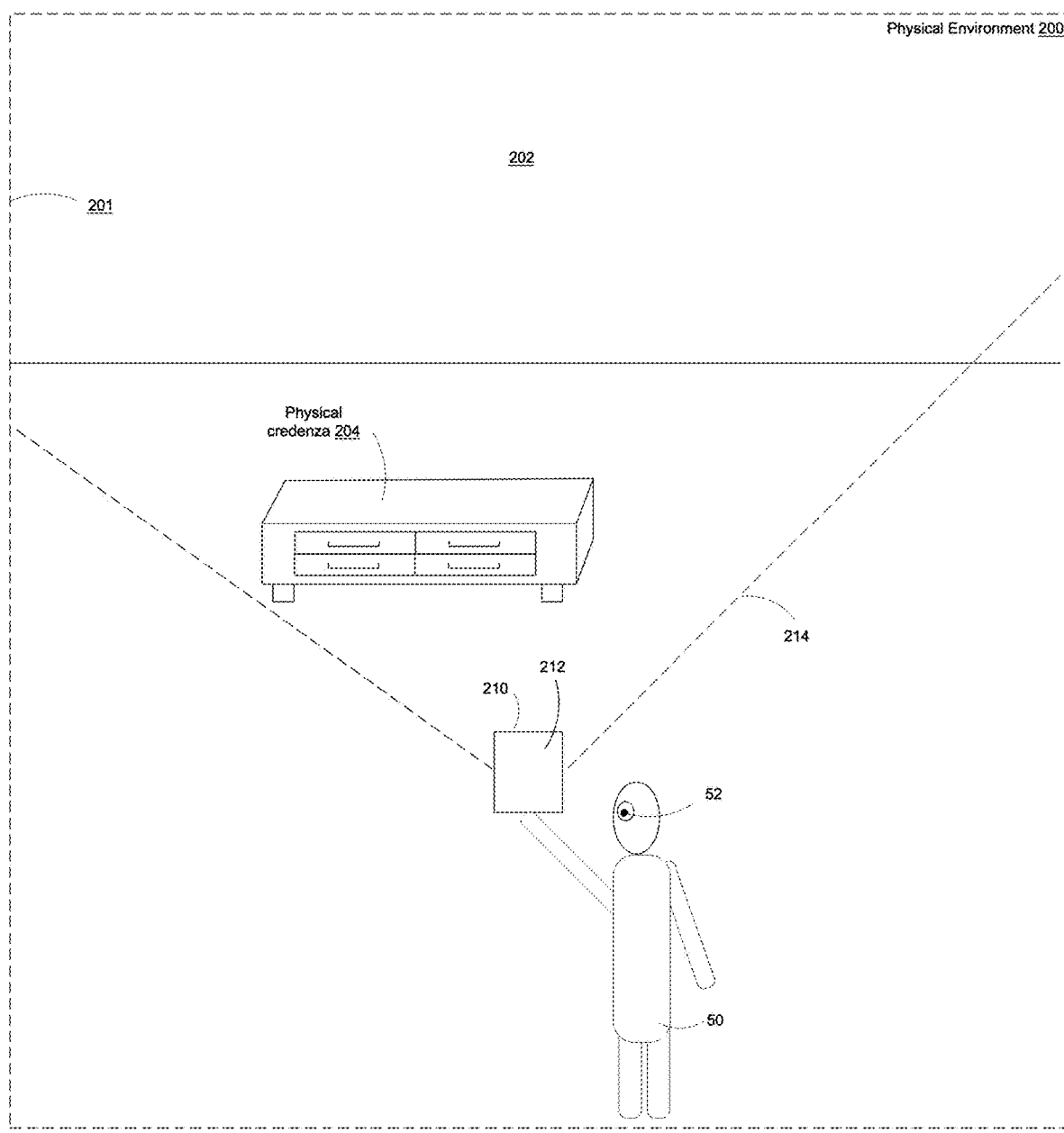
FIGS. 2A-2U are examples of directing a virtual agent to perform various actions based on respective eye behaviors of a user in accordance with some implementations.
Figure 2B:
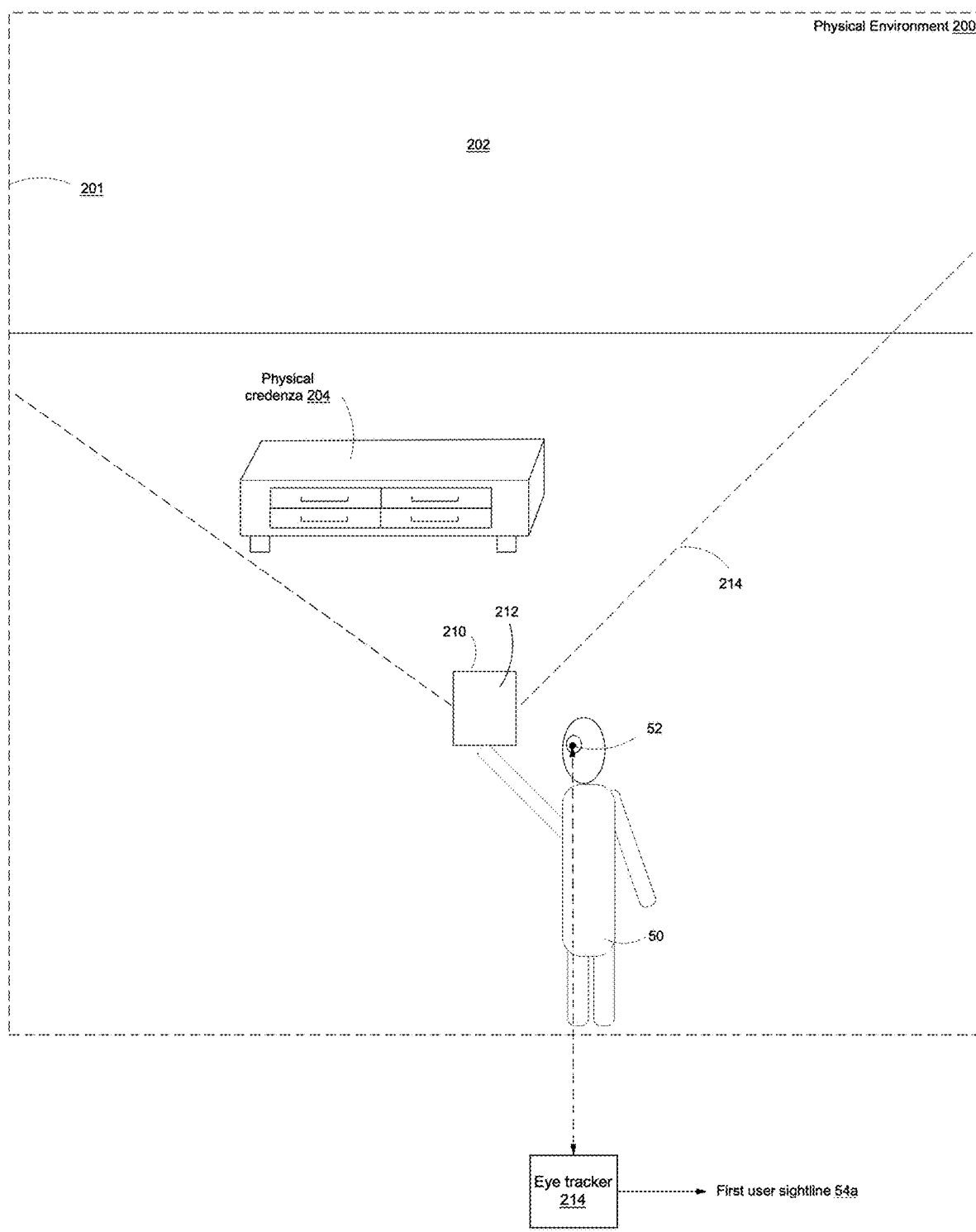
Figure 2C:
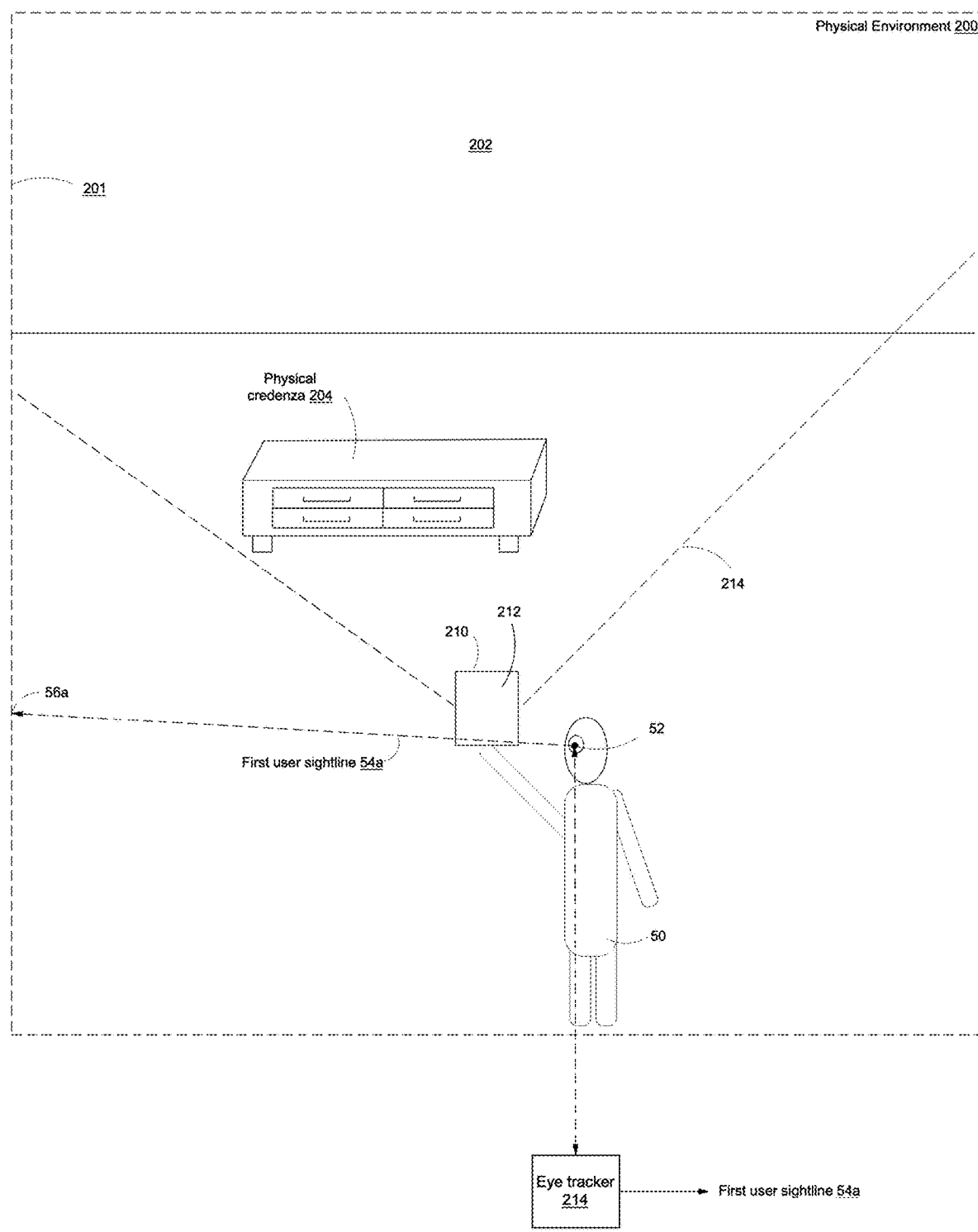
Figure 2D:
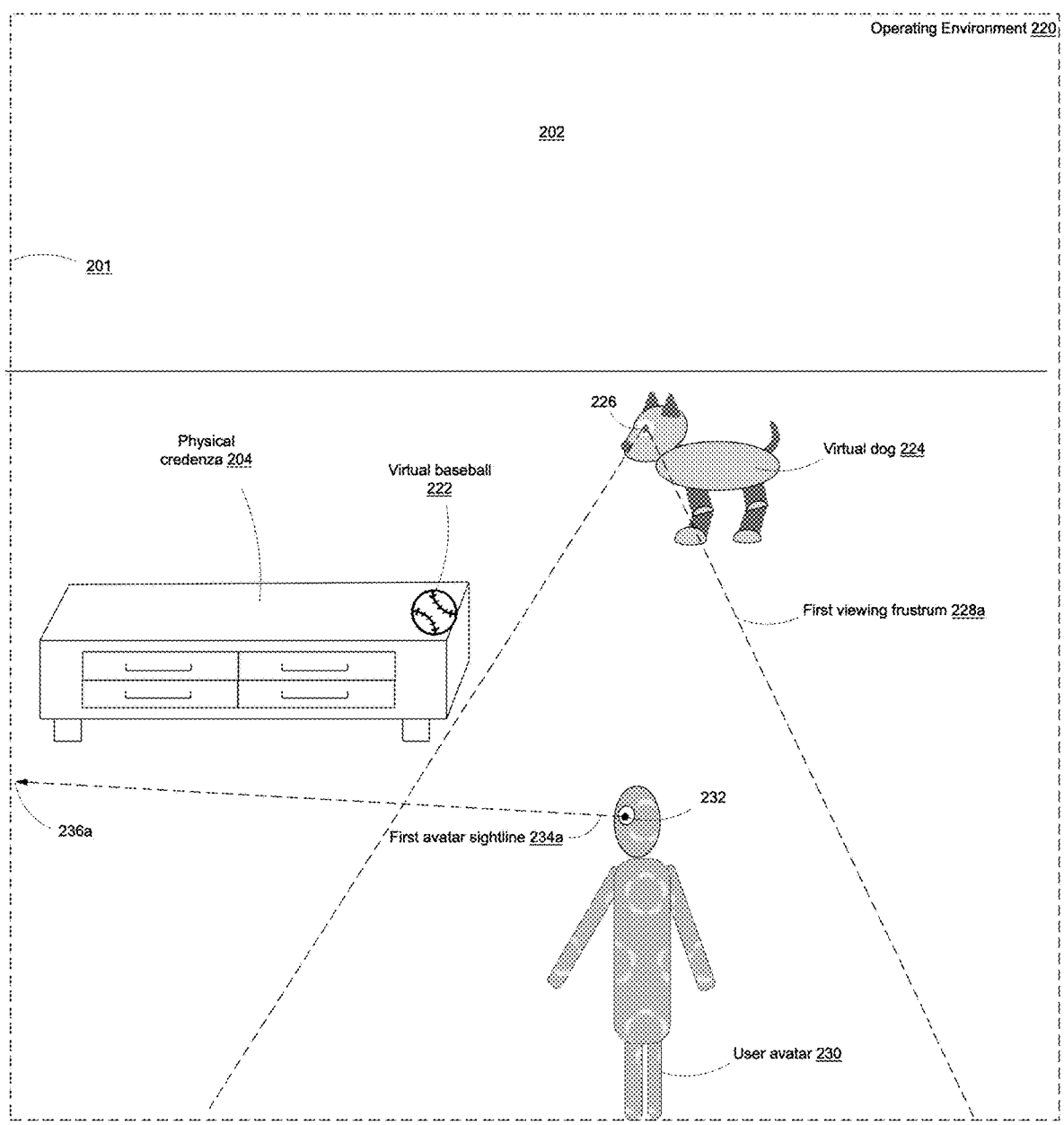
Figure 2E:
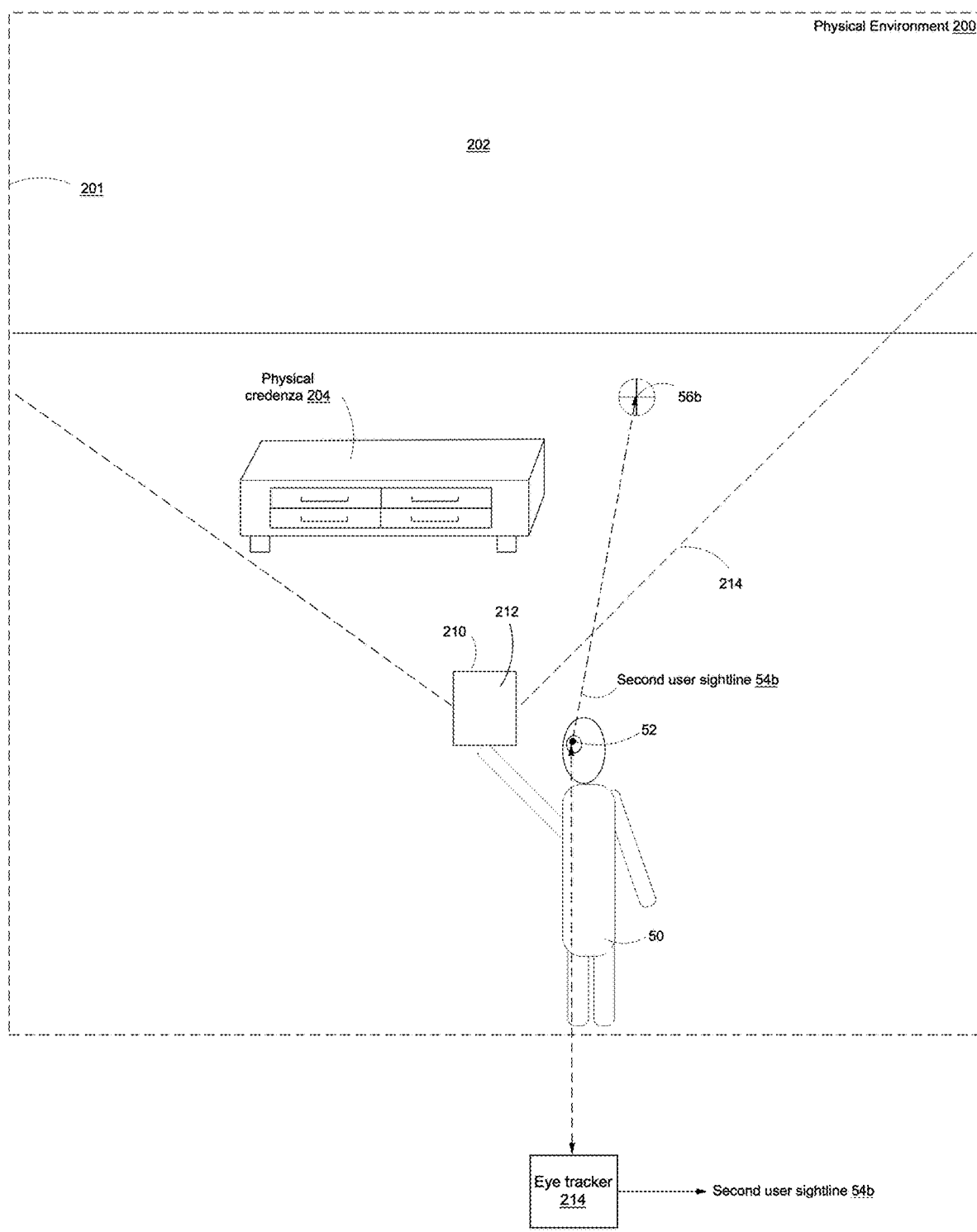
Figure 2F:
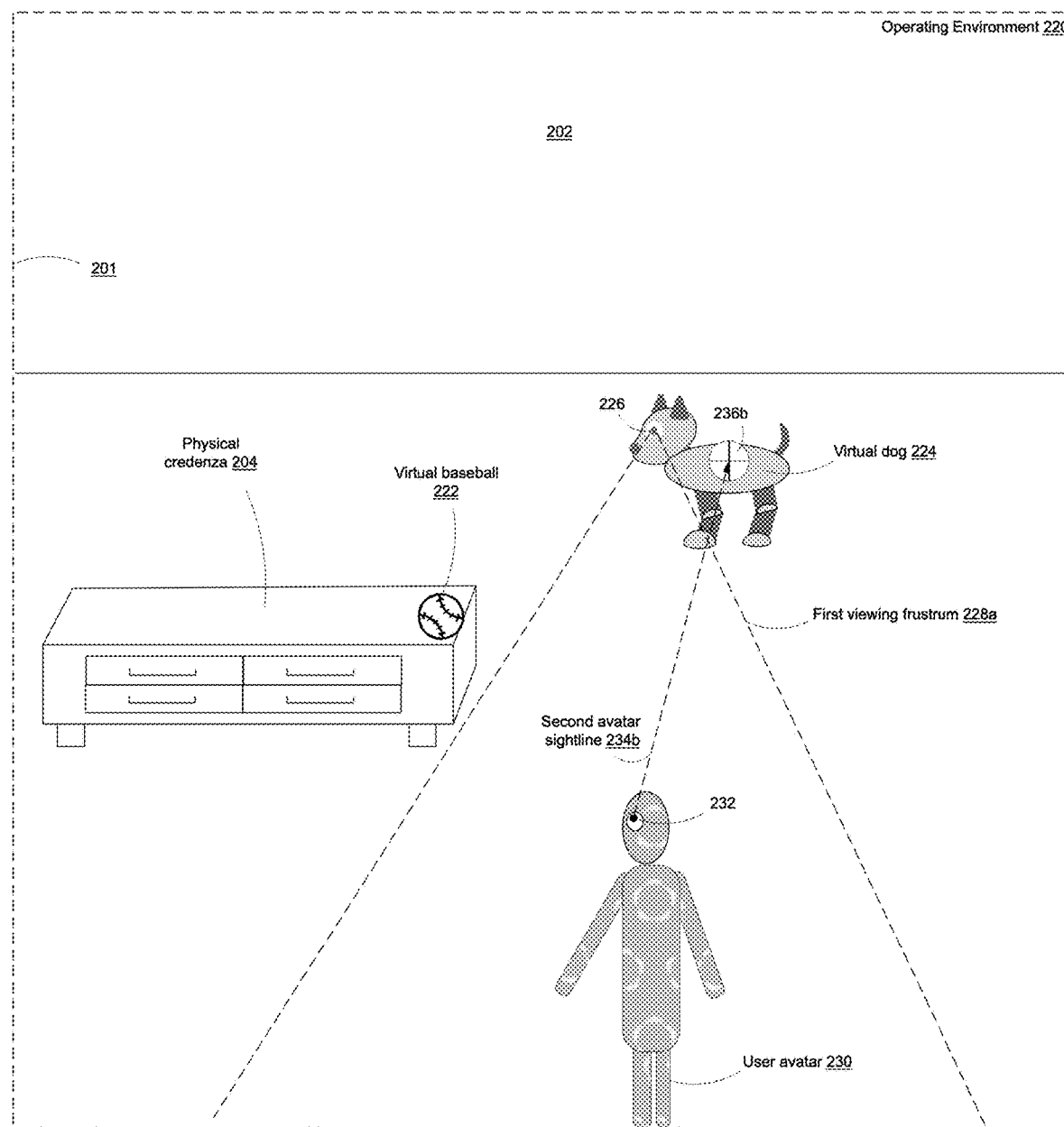
Figure 2G:
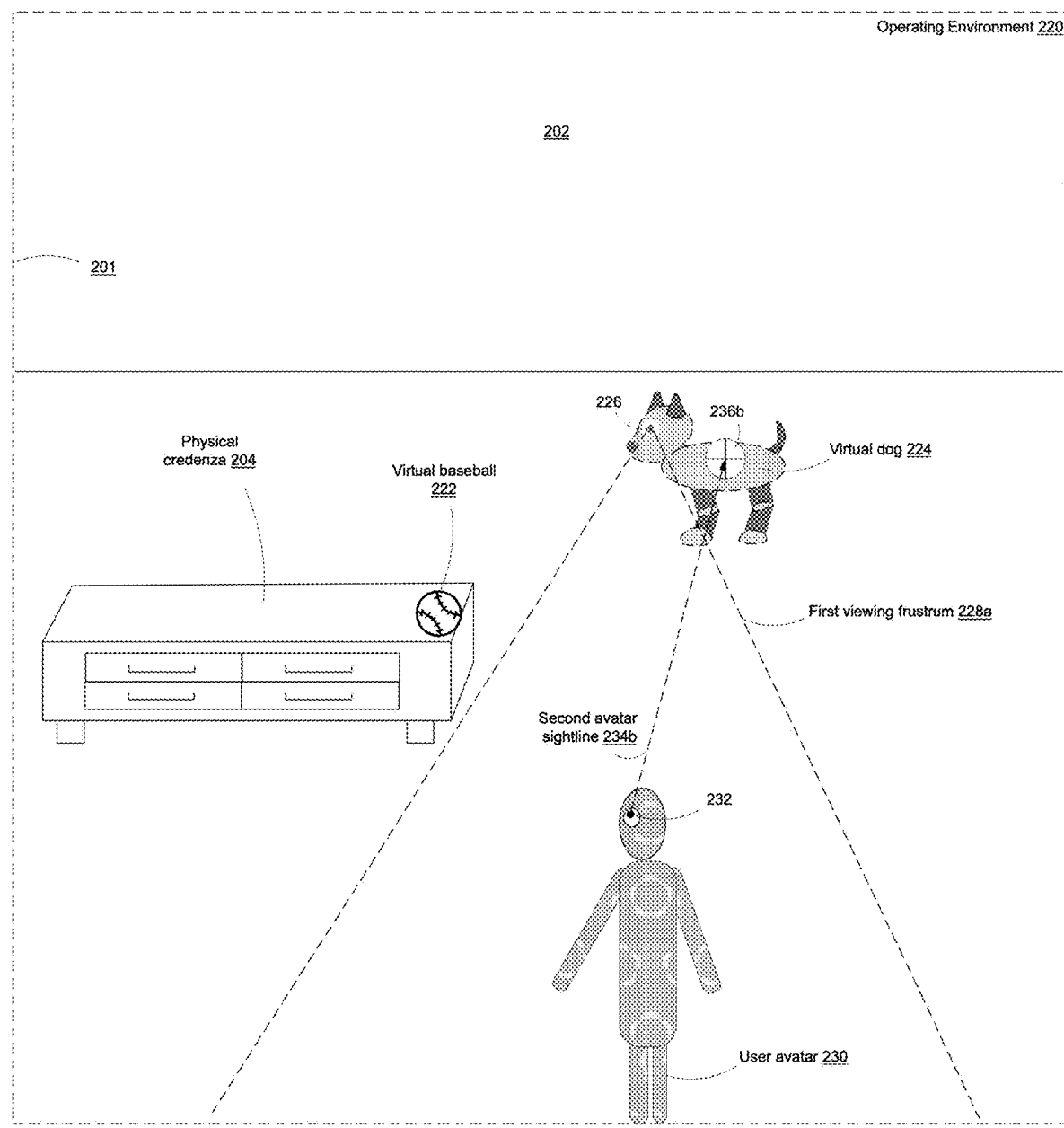
Figure 2H:
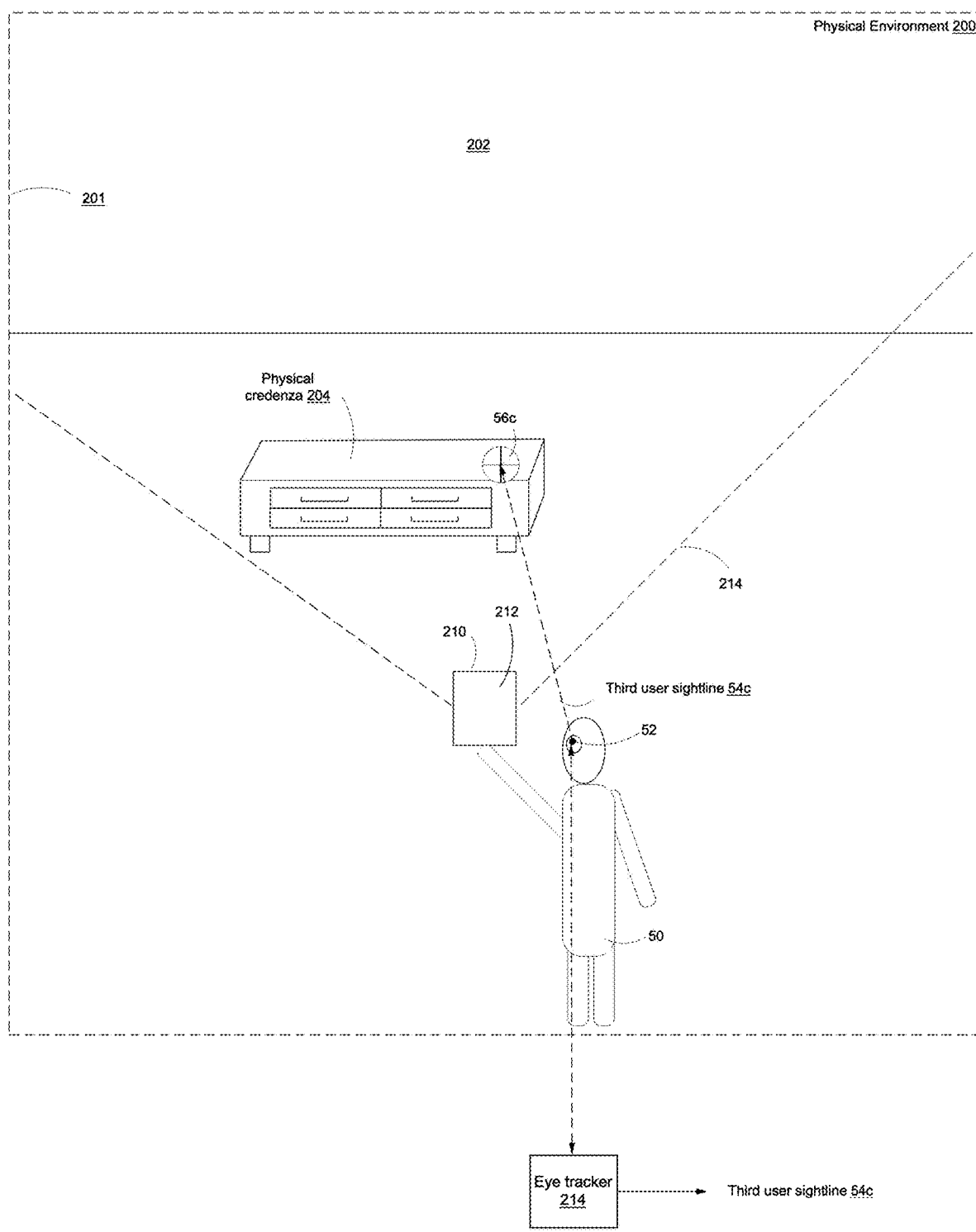
Figure 2I:
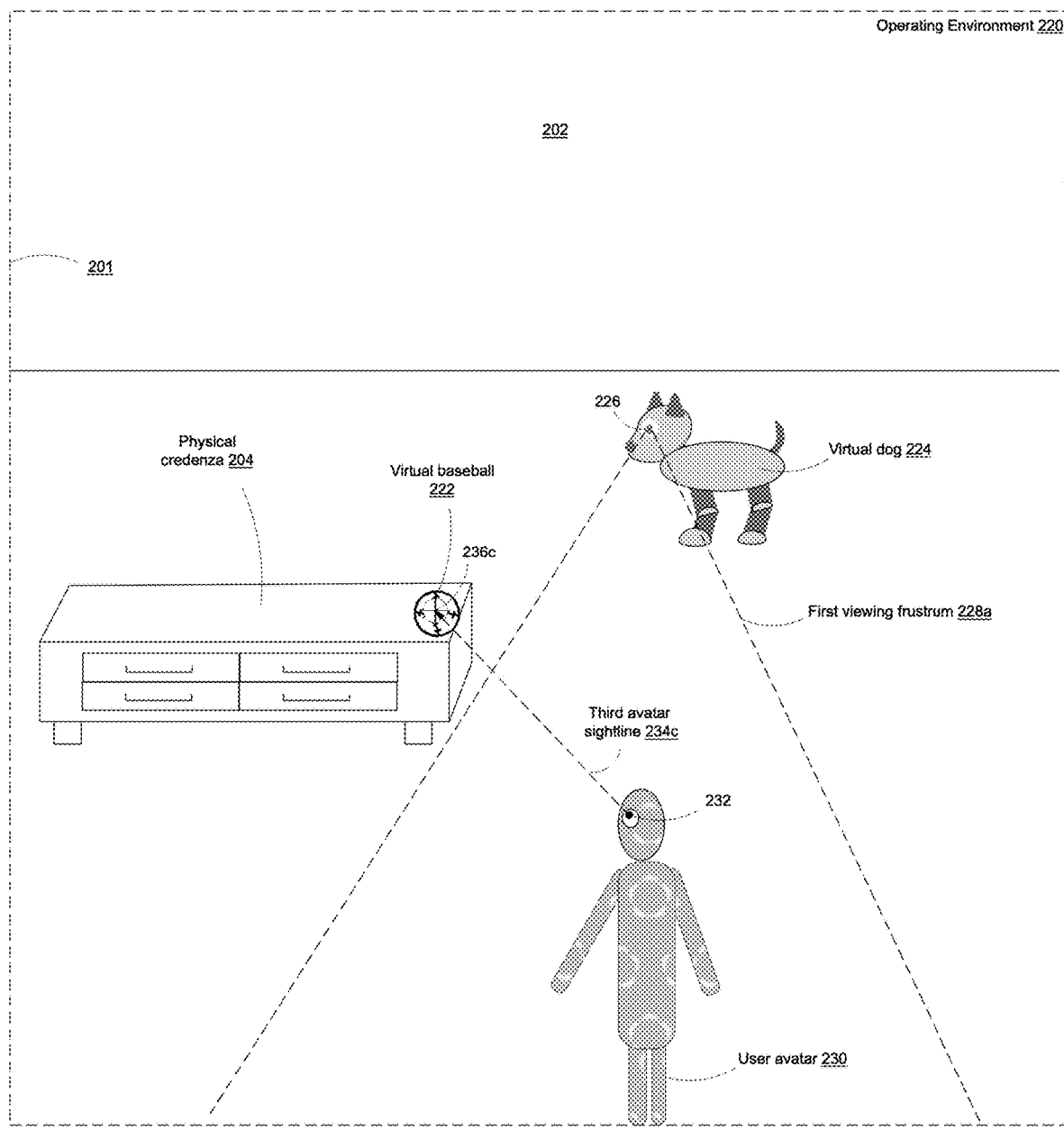
Figure 2J:
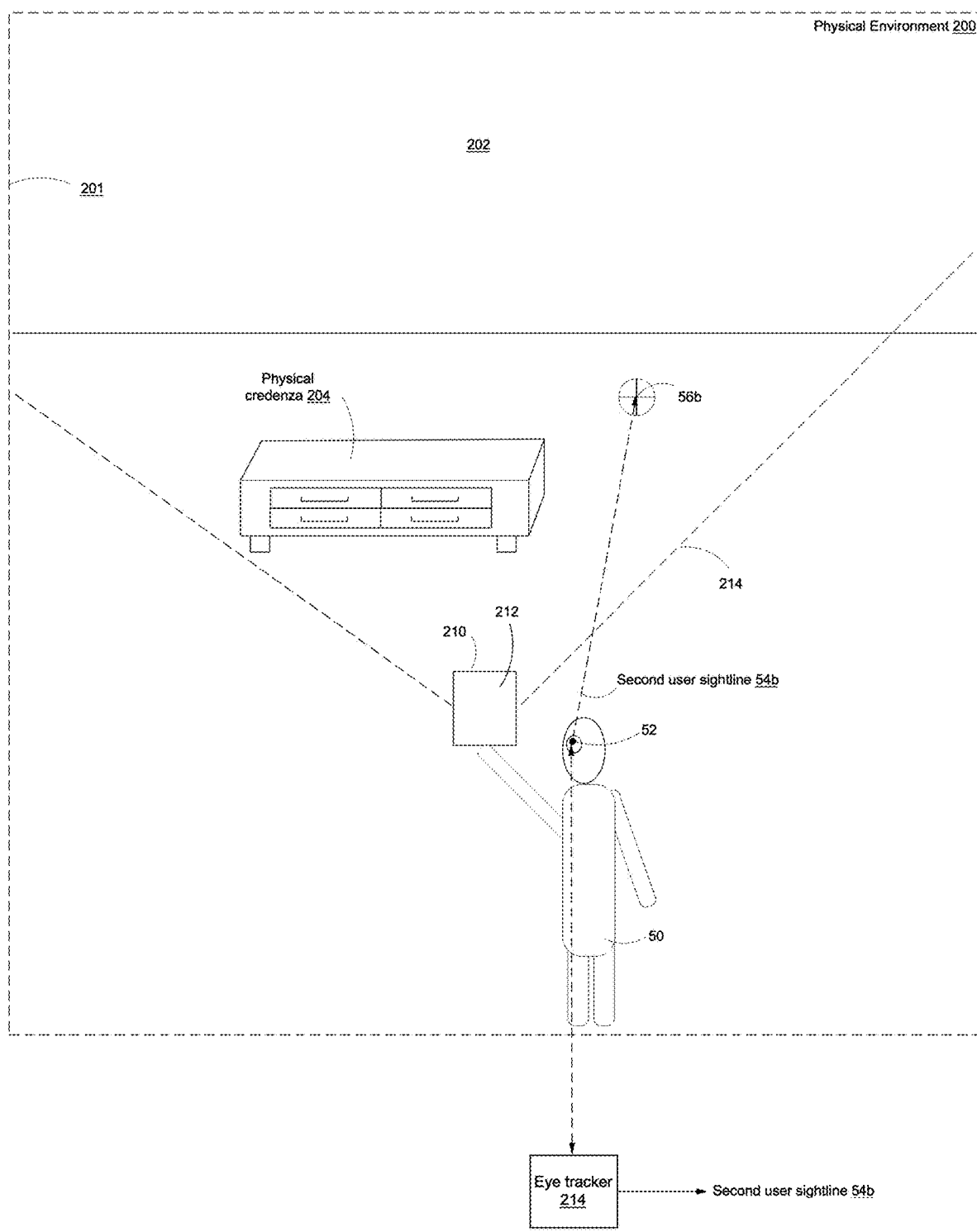
Figure 2K:
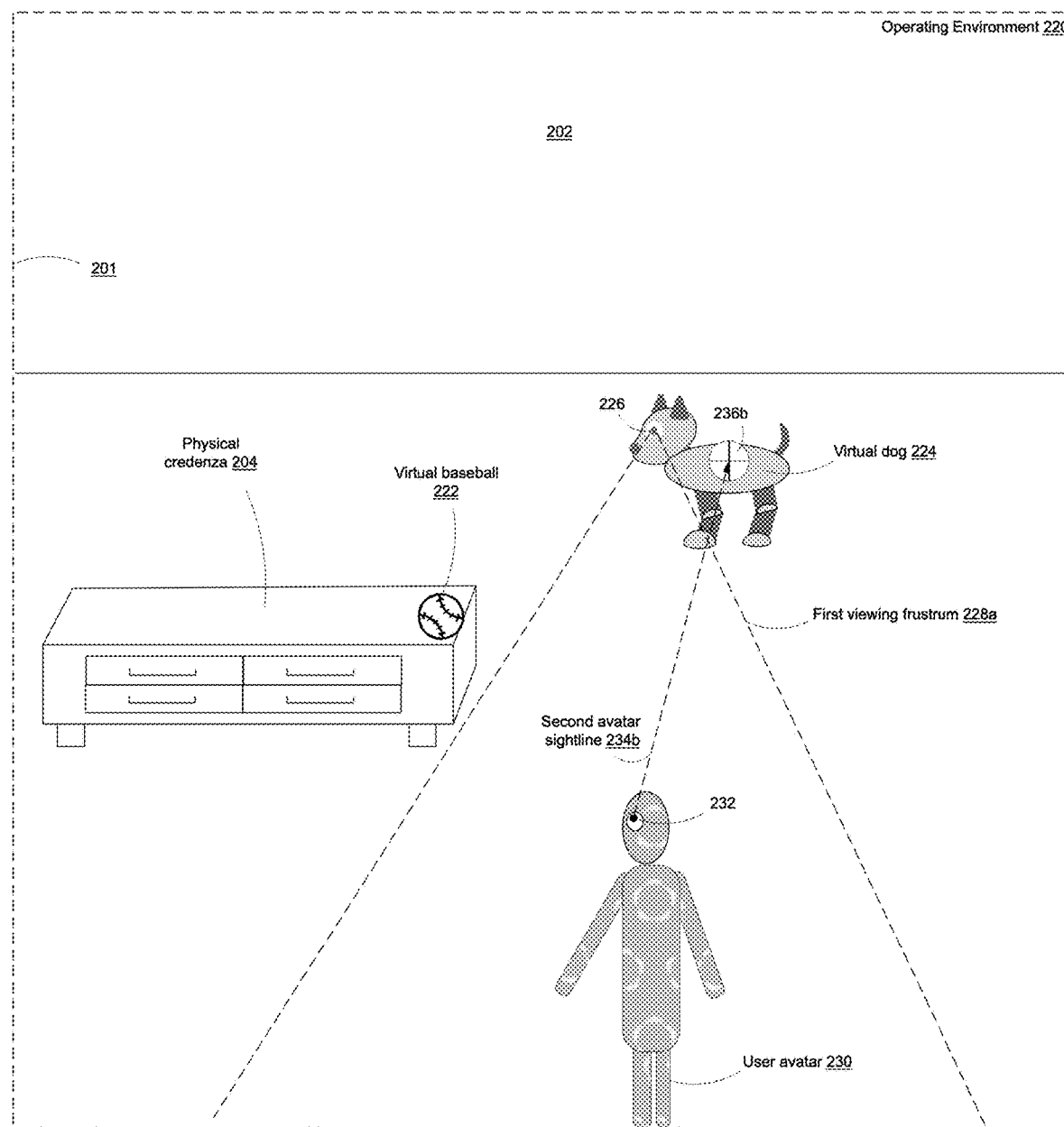
Figure 2L:
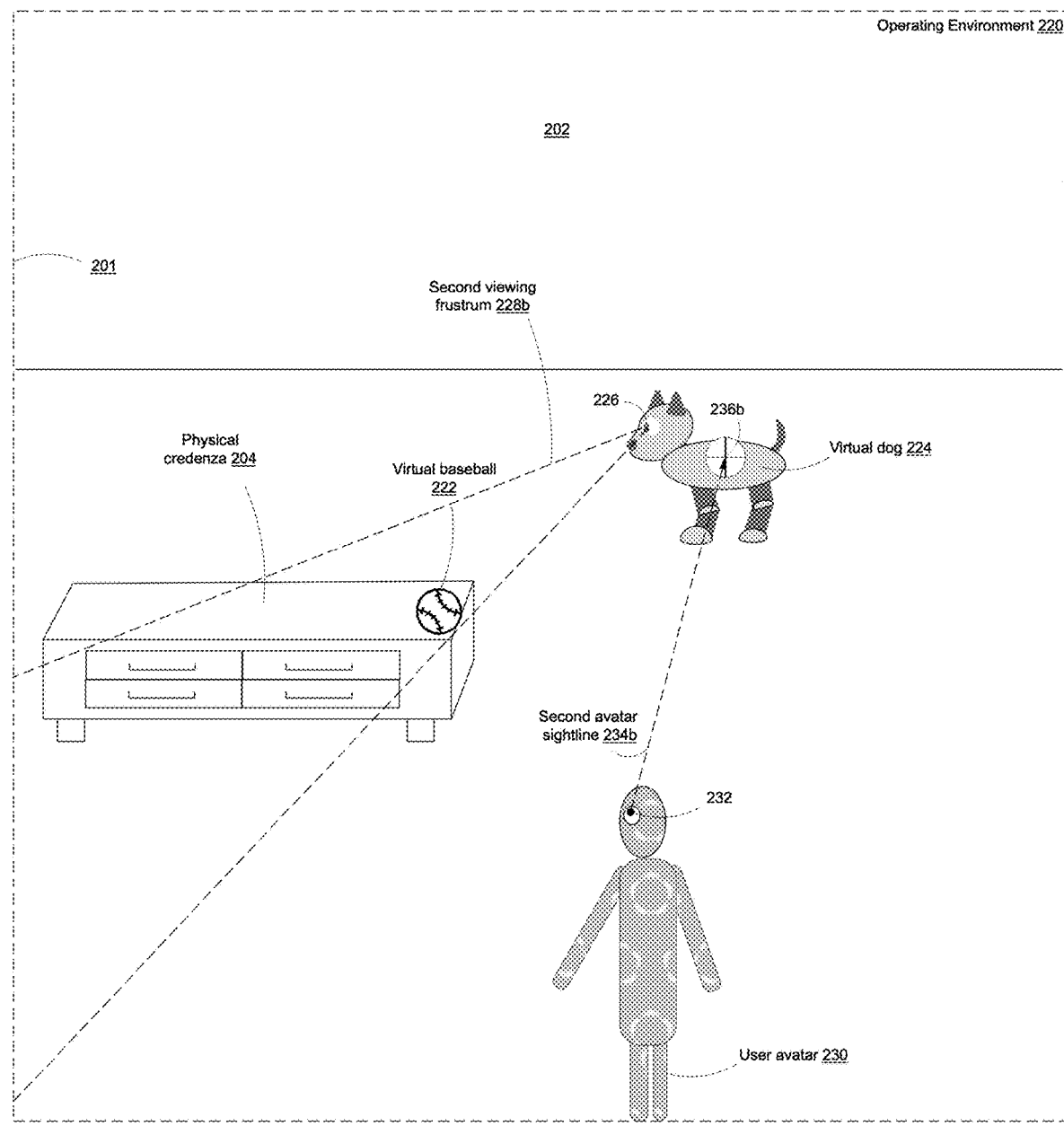
Figure 2M:
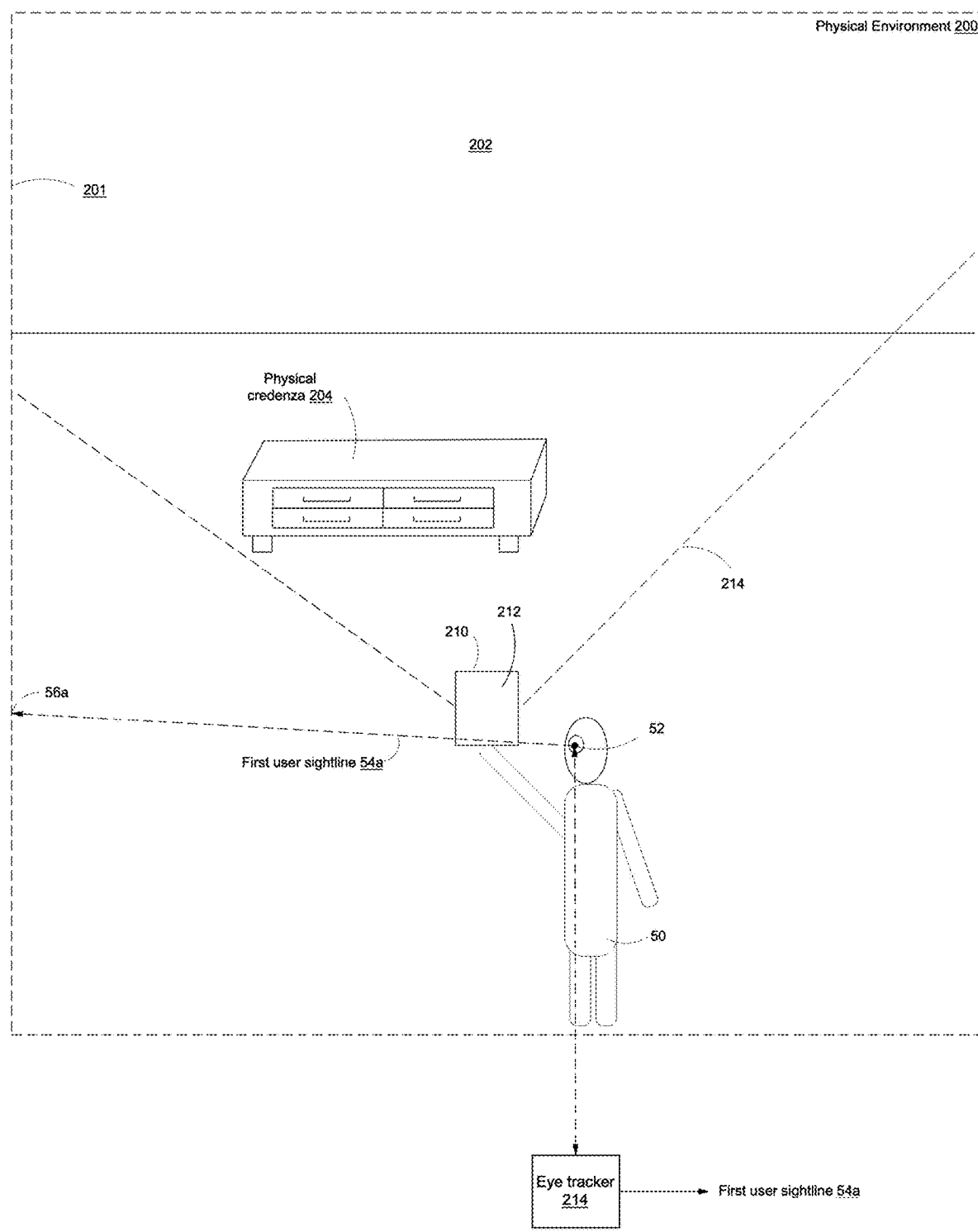
Figure 2N:
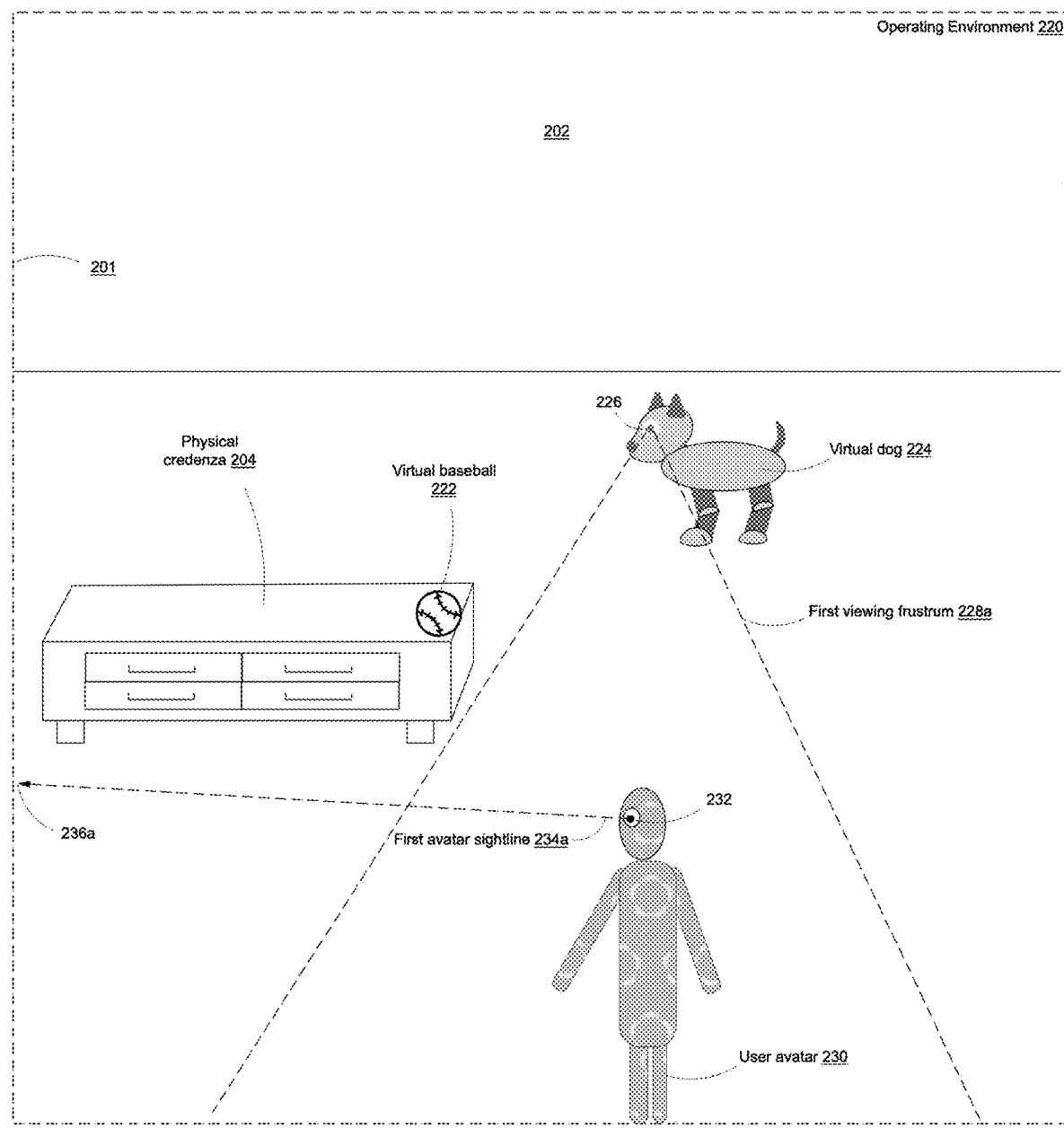
Figure 2O:
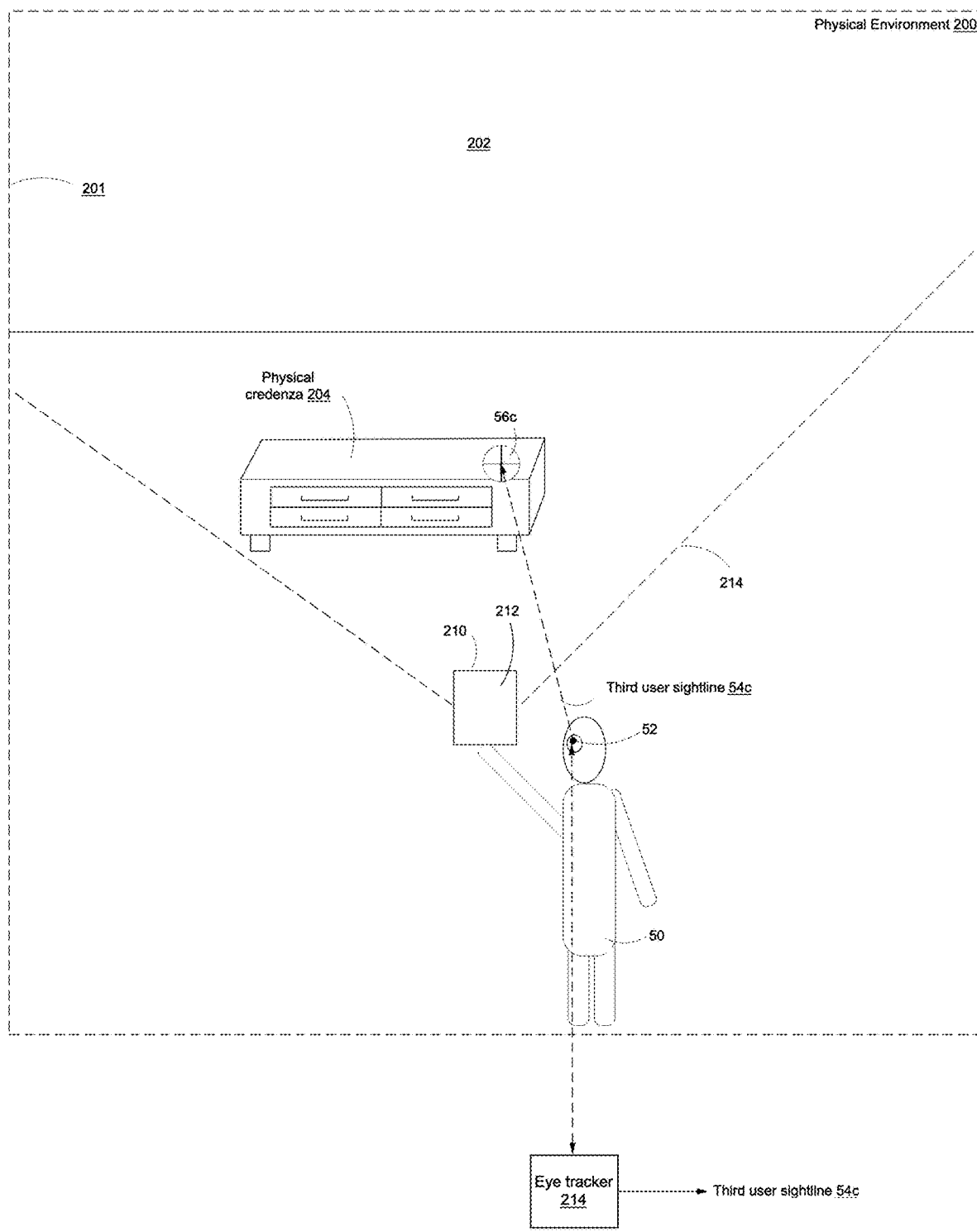
Figure 2P:
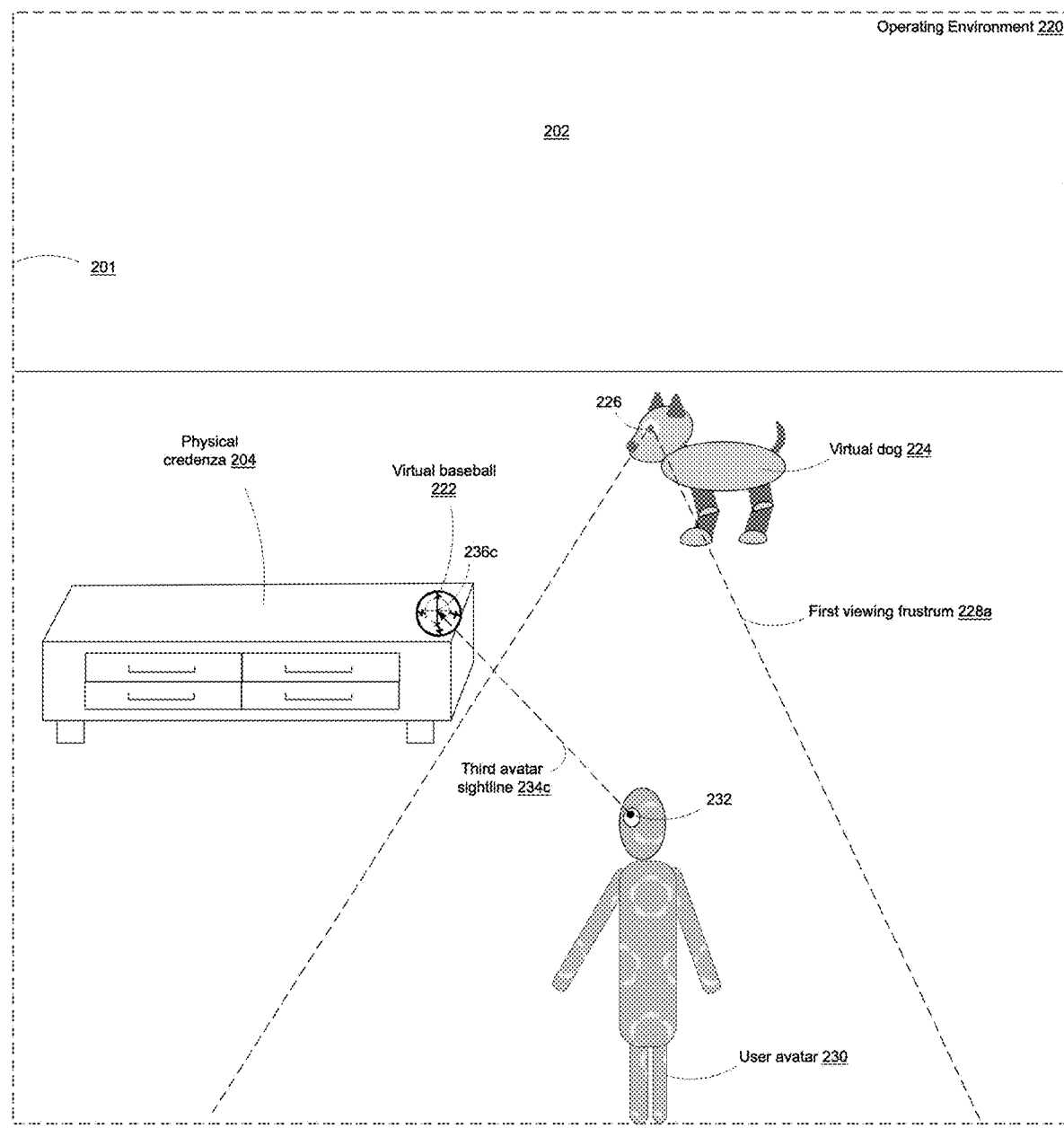
Figure 2Q:
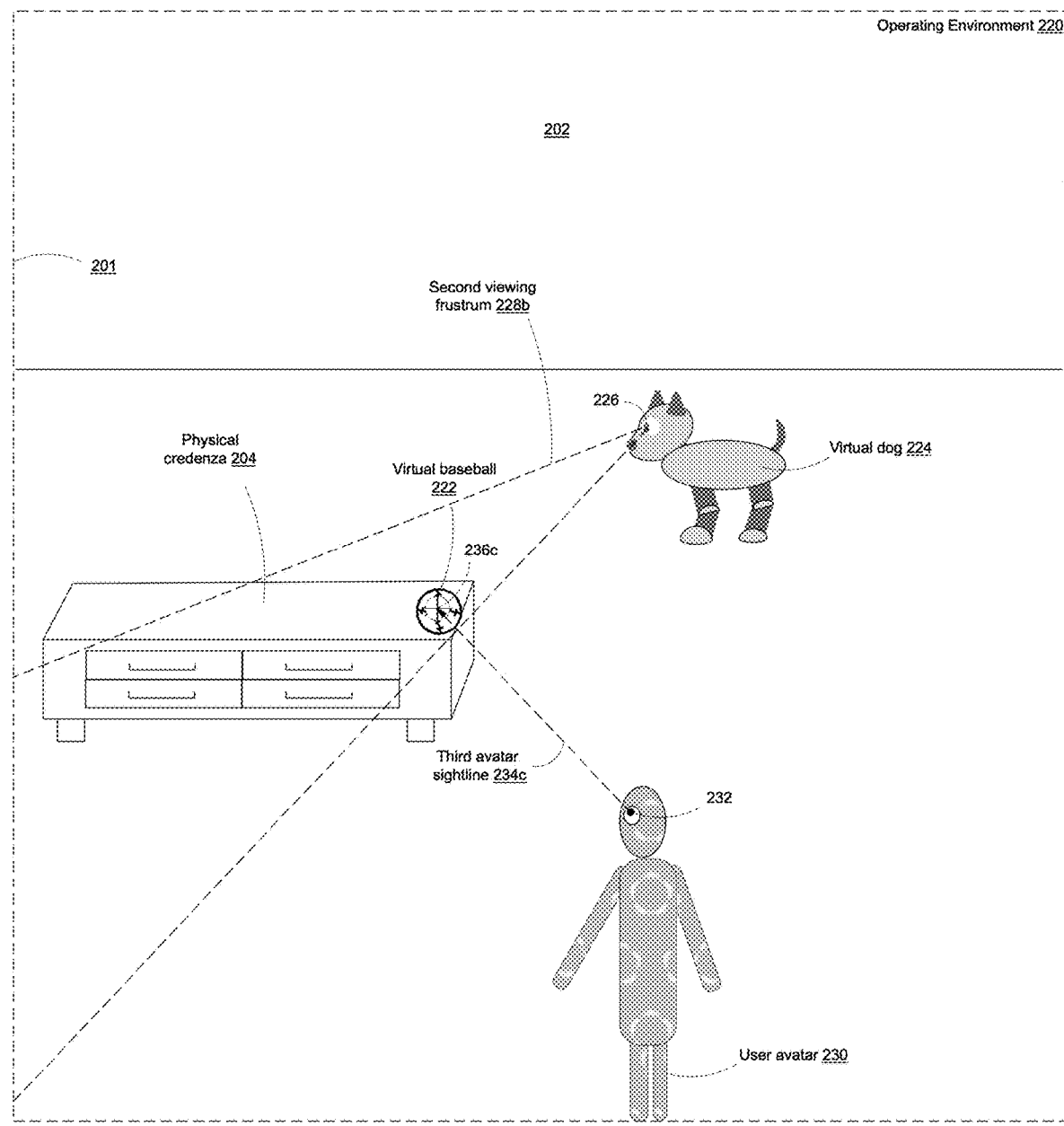
Figure 2R:
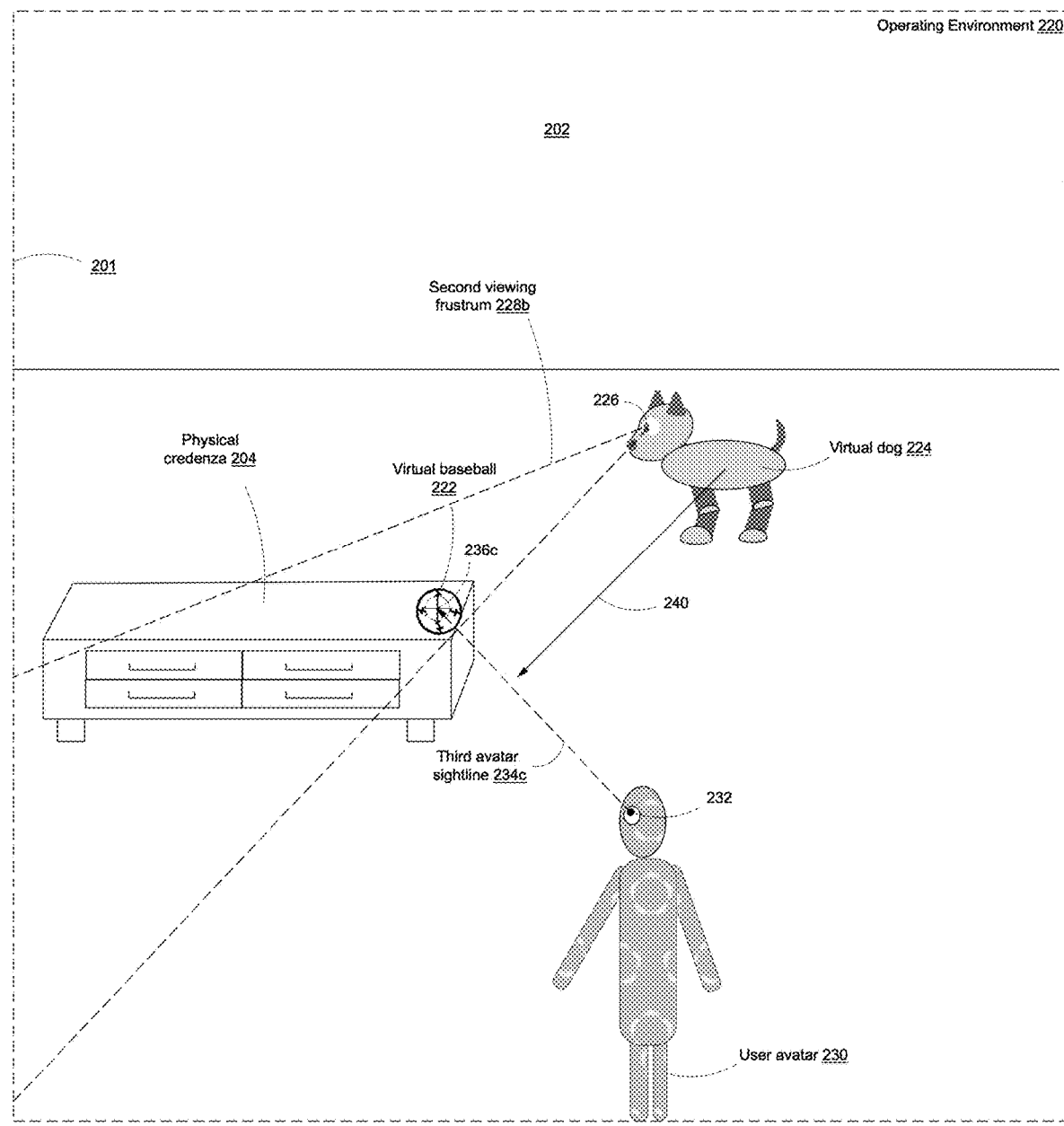
Figure 2S:
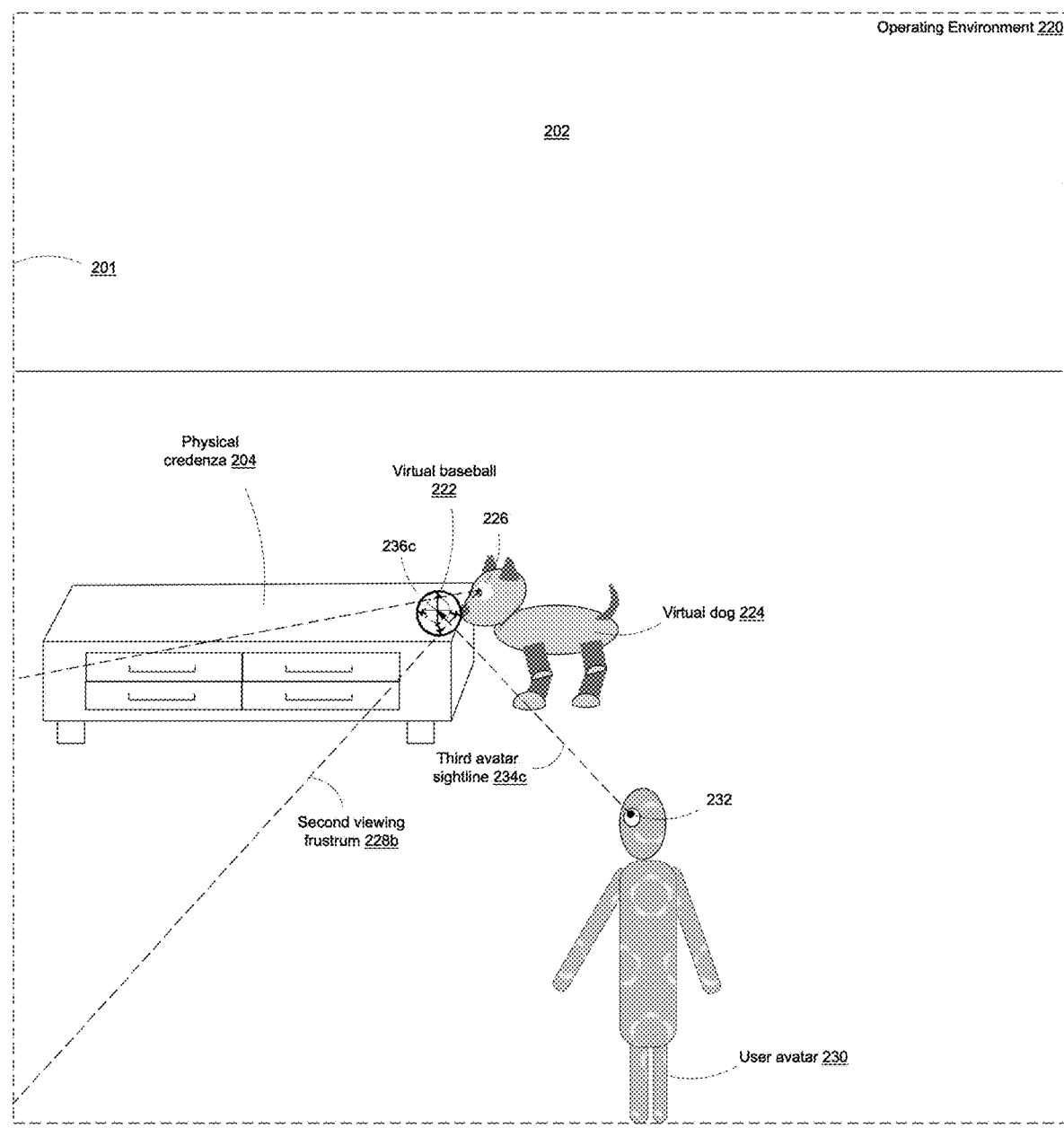
Figure 2T:
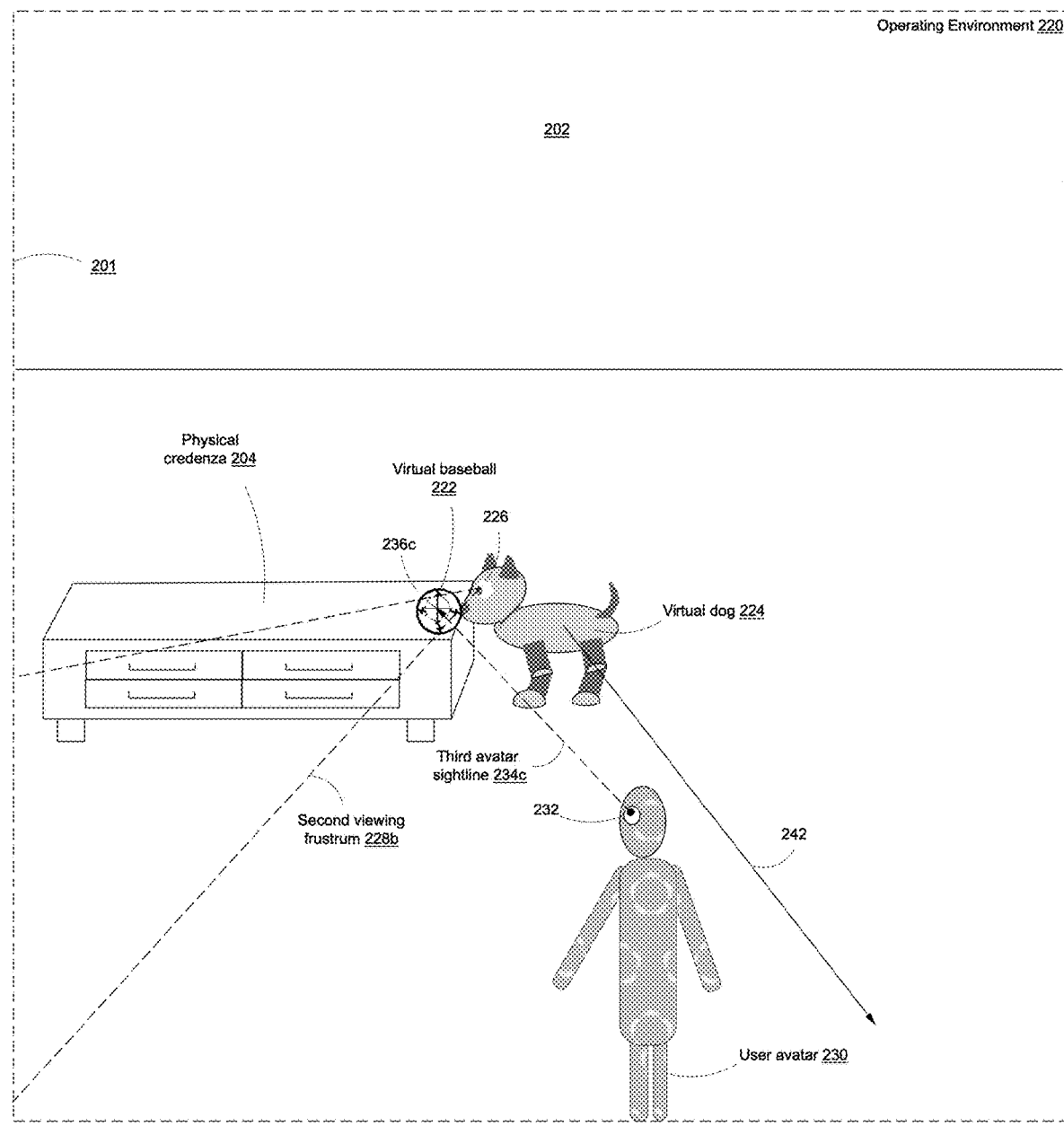
Figure 2U:
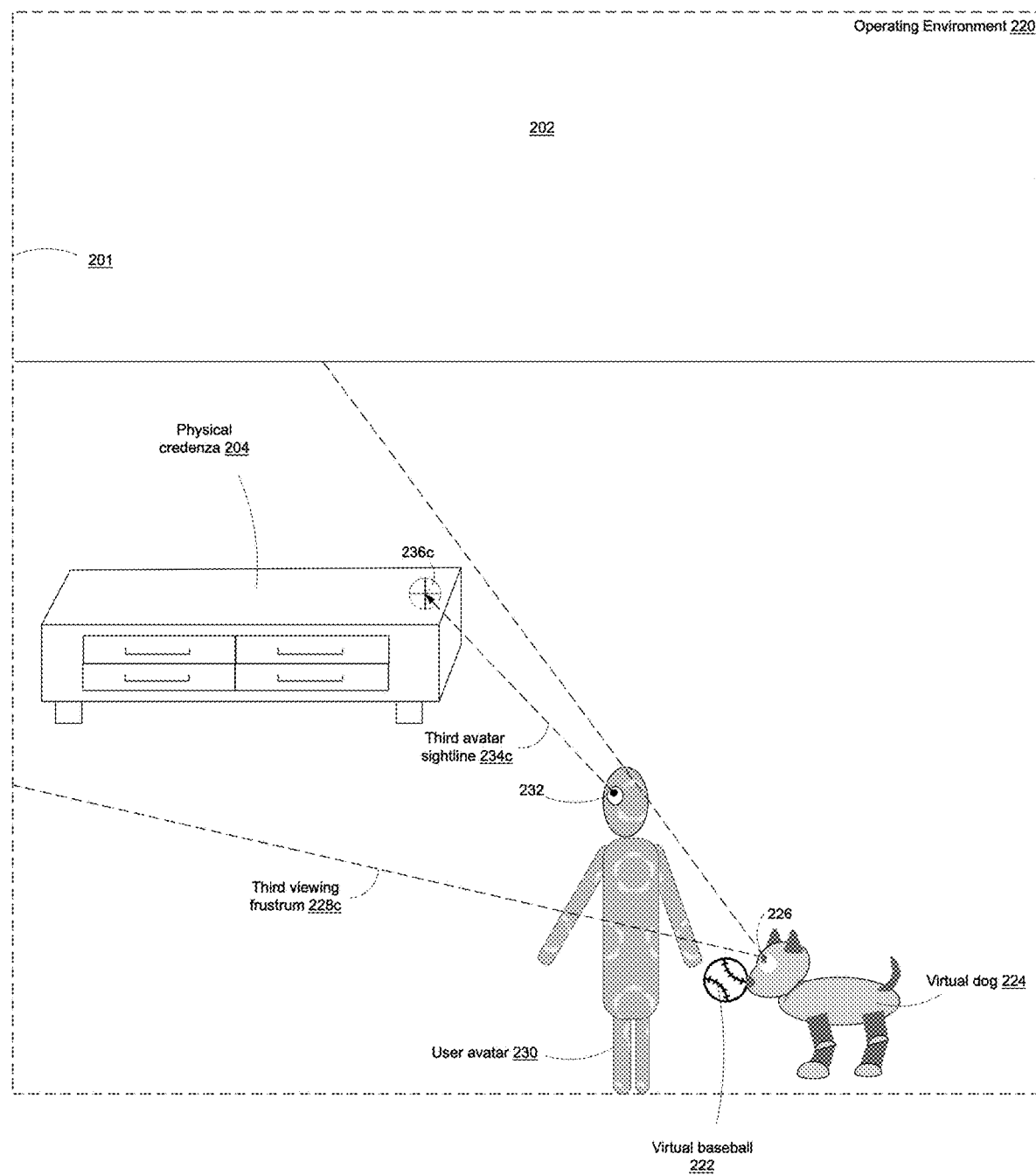

FIGS. 2A-2U are examples of directing a virtual agent to perform various actions based on respective eye behaviors of a user in accordance with some implementations. As illustrated in FIG. 2A, a physical environment 200 includes a first physical wall 201, a second physical wall 202, and a physical credenza 204. The long edge (the length) of the physical credenza 204 runs substantially parallel to the second physical wall 202, and the short edge (the width) of the physical credenza 204 runs substantially parallel to the first physical wall 201.

The physical environment 200 further includes a user 50 holding an electronic device 210. The electronic device 210 includes a display 212 that is associated with a viewable region 214 of the physical environment 200. The viewable region 214 includes a portion of the first physical wall 201, a portion of the second physical wall 202, and the physical credenza 204. In some implementations, the electronic device 210 corresponds to a mobile device, such as a smartphone, tablet, wearable device, and/or the like. The user 50 includes an eye 52, with the other eye of the user 50 not illustrated in FIG. 2A.

In some implementations, the electronic device 210 corresponds to a head-mountable device (HMD) that includes an integrated display (e.g., a built-in display). In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure.

In some implementations, the electronic device 210 includes an image sensor, such as a scene camera. The image sensor may capture image data characterizing the physical environment 200. The image data may correspond to an image or a sequence of images (e.g., a video stream). The electronic device 210 may include a compositing system that composites the image data with computer-generated content (e.g., virtual baseball 222 and the virtual agent 224 illustrated in FIG. 2D). To that end, in some implementations, the electronic device 210 includes a rendering system (e.g., a graphics processing unit (GPU)) that renders an object in order to generate corresponding computer-generated content.

In some implementations, the electronic device 210 includes a see-through display. The see-through display permits ambient light from the physical environment 200 through the see-through display, and the representation of the physical environment is a function of the ambient light. In some implementations, the see-through display is an additive display that enables optical see-through of the physical surface, such as an optical HMD (OHMD). For example, unlike purely compositing using the image data, the see-through display is capable of reflecting projected images off of the display while enabling a user to see through the display.

As illustrated in FIG. 2B, in some implementations, the electronic device 210 includes an eye tracker 214. The eye tracker 214 obtains eye tracking data that is indicative of eye behavior associated with the eye 52 of the user 50. For example, the eye behavior indicates one or more of a sightline, focus (e.g., gaze) position, eye movement, etc. For example, as illustrated in FIG. 2B, based on the eye tracking data the eye tracker 214 determines a first user sightline 54a. As illustrated in FIG. 2C, the first user sightline 54a intersects with the first physical wall 201 at a first focus position 56a. In other words, the eye 52 of the user 50 is focused on a point or portion of the first physical wall 201.

As illustrated in FIG. 2D, in some implementations, the electronic device 210 operates according to an operating environment 220, such as an XR environment described above. To that end, in some implementations, the electronic device 210 obtains, via an image sensor, image data characterizing the physical environment 200. The image sensor may have a field of view that approximately corresponds to the viewable region 214 of the display 212. Accordingly, the image data includes respective representations of the physical features of the physical environment 200. Thus, the operating environment 220 includes respective representations of the first physical wall 201, the second physical wall 202, and the physical credenza 204. Moreover, the operating environment 220 includes various computer-generated content, including a virtual baseball 222 resting on the physical credenza 204, a virtual dog 224, and a user avatar 230. In some implementations, the electronic device 210 composites the image data with the computer-generated content in order to generate the operating environment 220. In some implementations, the electronic device 210 displays, on the display 212, the respective representations of the physical features, and further displays the virtual baseball 222 and the virtual dog 224.

The user avatar 230 is associated with (e.g., visually represents) the user 50. Accordingly, the user avatar 230 includes a visual representation of an eye 232, which may represent the eye 52 of the user 50. In some implementations, based on the first user sightline 54a associated with the user 50, the electronic device 210 determines a first avatar sightline 234a associated with the user avatar 230. For example, as illustrated in FIG. 2D, the first avatar sightline 234a intersects with a first point 236a of the first physical wall 201 that approximately corresponds to the first focus position 56a associated with the eye 52 of the user 50.

In some implementations, the electronic device 210 engages in a copresence session with another electronic device, enabling the electronic device 210 and the other electronic device to concurrently operate according to the operating environment 220. Accordingly, the other electronic device may display the user avatar 230, and the electronic device 210 may display a user avatar representing a user of the other electronic device.

The virtual dog 224 includes a virtual eye 226 that is associated with a first viewing frustum 228a. Notably, the first viewing frustum 228a includes the user avatar 230. In other words, the virtual dog 224 is focused on a region of the operating environment 220 including the user avatar 230, enabling the virtual dog 224 to respond to an eye behavior of the user avatar 230. The electronic device 210 determines the eye behavior of the user avatar 230 based on a corresponding tracked eye behavior of the eye 52 of the user 50.

As illustrated in FIG. 2E, the eye tracker 214 tracks the eye 52 of the user 50 and determines a change from the first user sightline 54a to a second user sightline 54b. The second user sightline 54b intersects a second focus position 56b of the physical environment 200 corresponding to a point that is above and to the right of the physical credenza 204.

Based on the change to the second focus position 56b, the electronic device 210 updates the visual representation of the eye 232 of the user avatar 230, as illustrated in FIG. 2F. Namely, the visual representation of the eye 232 changes from the first avatar sightline 234a to a second avatar sightline 234b, which approximately corresponds to the second user sightline 54b. Notably, the second avatar sightline 234b intersects with a second point 236b on the virtual dog 224. In other words, the focus of the user avatar 230 is directed to the virtual dog 224.

In some implementations, based on the focus of the user avatar 230 being directed to the virtual dog 224, the electronic device 224 activates the virtual dog 224 (e.g., enables the virtual dog 224 to perform an action). In some implementations, as illustrated in FIGS. 2F and 2G, the electronic device 210 changes the appearance of the virtual dog 224 from solid line boundaries to dotted line boundaries in order to indicate the activation. Changing the appearance of the virtual dog 224 on the display 212 provides feedback to the user 50 that the virtual dog 224 has been activated, reducing the likelihood that the user 50 provides subsequent inputs that attempt to activate the virtual dog 224 and thereby reducing resource utilization by the electronic device 210.

As illustrated in FIG. 2H, the eye tracker 214 tracks the eye 52 of the user 50 and determines a change from the second user sightline 54b to a third user sightline 54c. The third user sightline 54c intersects a third focus position 56c of the physical environment 200. The third focus position 56c corresponds to a point on the top surface of the physical credenza 204.

Based on the change to the third focus position 56c, the electronic device 210 updates the visual representation of the eye 232 of the user avatar 230, as illustrated in FIG. 2I. Namely, the visual representation of the eye 232 changes from the second avatar sightline 234b to a third avatar sightline 234c, which approximately corresponds to the third user sightline 54c. Notably, the third avatar sightline 234c intersects with a third point 236c that is on the virtual baseball 222. In other words, the focus of the user avatar 230 is directed to the virtual baseball 222.

As illustrated in FIG. 2J, the eye tracker 214 tracks the eye 52 of the user 50 and determines a change from the third user sightline 54c to the second user sightline 54b, associated with the second focus point 56b. For example, the eye behavior of the user 50 corresponds to a saccade that originates at the position of the virtual dog 224 (illustrated in FIG. 2E), moves to the position of the physical credenza 204 (illustrated in FIG. 2H), and moves back to the position of the virtual dog 224 (illustrated in FIG. 2J). Based on the change to the second focus position 56b, the electronic device 210 updates the visual representation of the eye 232 of the user avatar 230 back to the second avatar sightline 234b, associated with the second point 236b corresponding to the virtual dog 224, as illustrated in FIG. 2K.

According to various implementations, based on an eye behavior of the user avatar 230, the electronic device 210 directs the virtual dog 224 to perform one or more actions. For example, based on the movement of the visual representation of the eye 232 from the virtual dog 224 to the virtual baseball 222 and back to the virtual dog 224, the electronic device 210 directs the virtual agent 224 to change an appearance of the virtual eye 226. As one example, as illustrated in FIG. 2L, the electronic device 210 directs the virtual dog 224 to change the virtual eye 226 from the first viewing frustum 228a to a second viewing frustum 228b. To that end, in some implementations, the electronic device 210 selects the second viewing frustum 228b to include the virtual baseball 222 because the user avatar 230 was previously focusing on the virtual baseball 222. In other words, the electronic device 210 directs the virtual dog 224 to change its gaze target to approximately match the previous gaze of the user avatar 230.

As illustrated in FIG. 2M, the eye tracker 214 tracks the eye 52 of the user 50 and determines a change from the second user sightline 54b to the first user sightline 54a, associated with the first focus point 56a. Based on the change to the first focus position 56a, the electronic device 210 updates the visual representation of the eye 232 of the user avatar 230 to the first avatar sightline 234a, associated with the second point 236a, as illustrated in FIG. 2N. Moreover, because the focus of the user 50 has moved away from the virtual baseball 224 (e.g., for at least a threshold amount of time), the electronic device 210 directs the virtual dog 224 to change from the second viewing frustum 228b to the first viewing frustum 228a, as illustrated in FIG. 2N. The first viewing frustum 228a includes the user avatar 230, and thus the virtual dog 224 can view the user avatar 230 and await further instructions from the user avatar 230.

According to various implementations, the electronic device 210 directs the virtual dog 224 to perform one or more actions based on one or more respective duration thresholds associated with a focus position. Examples of utilizing duration thresholds are illustrated in FIGS. 2O-2U. As illustrated in FIG. 2O, the eye tracker 214 tracks the eye 52 of the user 50 and determines a change from the first user sightline 54a to the third user sightline 54c, associated with the third focus point 56c on the surface of the physical credenza 204. Based on the change to the third focus position 56c, the electronic device 210 updates the visual representation of the eye 232 of the user avatar 230 from the first avatar sightline 234a to the third avatar sightline 234c, as illustrated in FIG. 2P. The third avatar sightline 234c is associated with the third point 236c, which is located on the virtual baseball 222.

As illustrated in FIG. 2Q, based on the change to the third point 236c, the electronic device 210 directs the virtual dog 224 to update the virtual eye 226 to change from the first viewing frustum 228a to the second viewing frustum 228b, as is described with reference to FIGS. 2K and 2L.

In some implementations, the electronic device 210 determines that the eye 232 of the user avatar 230 maintains focus on the third point 236c (on the virtual baseball 222) for at least a first threshold duration. Based on satisfaction of the first threshold duration, the electronic device 210 directs the virtual dog 224 to move towards the virtual baseball 222, as indicated by a first movement line 240 in FIG. 2R. FIG. 2S illustrates completion of the movement of the virtual dog 224 to the virtual baseball 222.

Moreover, in some implementations, the electronic device 210 determines that the eye 232 of the user avatar 230 maintains focus on the third point 236c (on the virtual baseball 222) for at least a second threshold duration, which is larger than the first threshold duration. For example, the first threshold duration is two seconds from when the eye 232 of the user avatar 230 initially focuses on the virtual baseball 222, whereas the second threshold duration is four seconds from when the eye 232 of the user avatar 230 initially focuses on the virtual baseball 222. Based on satisfaction of the second threshold duration, the electronic device 210 directs the virtual dog 224 to bring the virtual baseball 222 to the user avatar 230, as indicated by a second movement line 242 in FIG. 2T. FIG. 2U illustrates completion of the movement of the virtual dog 224 and the virtual baseball 222 to the user avatar 230. Moreover, the electronic device 210 further directs the virtual dog 224 to change the virtual eye 226 from being associated with the second viewing frustum 228b to a third viewing frustum 228c. The third viewing frustum 228c includes the eye 232 of the user avatar 230, enabling the virtual dog 224 to receive further direction from (the eye 232 of) the user avatar 230.

Figure 3:
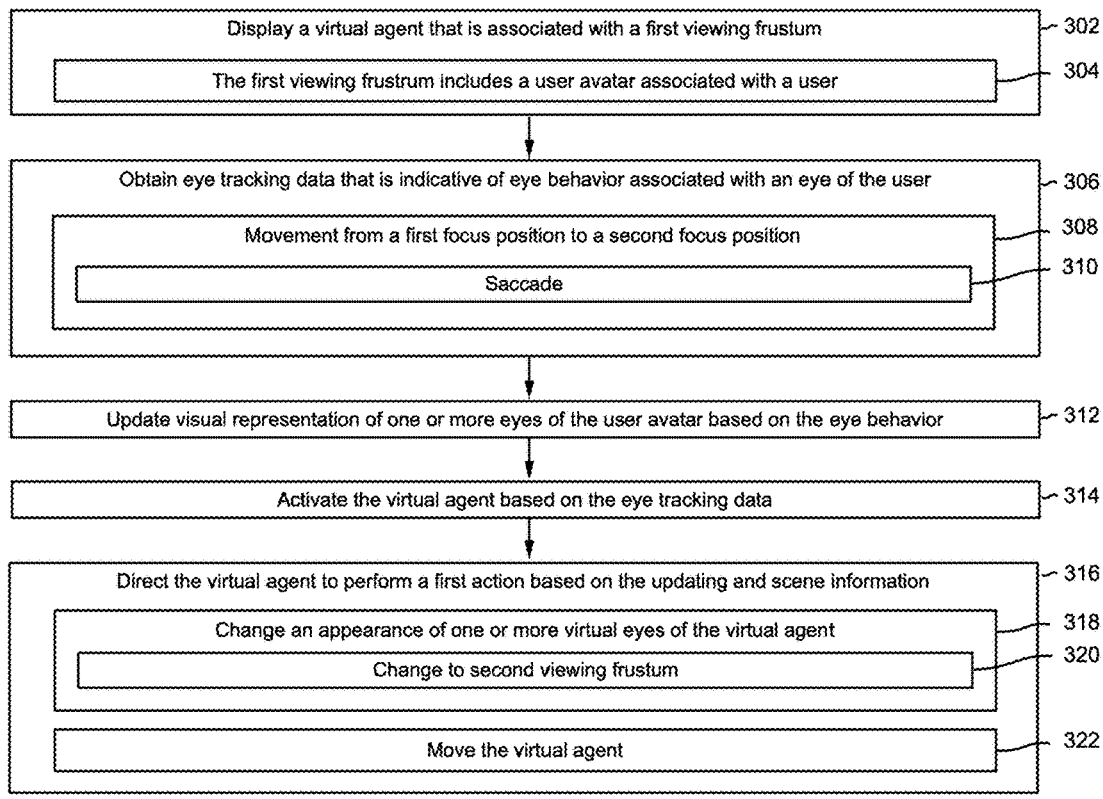
FIG. 3 is an example of a flow diagram of a method of directing a virtual agent to perform various actions based on eye behaviors of a user in accordance with some implementations.

FIG. 3 is an example of a flow diagram of a method 300 of directing a virtual agent to perform various actions based on eye behaviors of a user in accordance with some implementations. In various implementations, the method 300 or portions thereof are performed by an electronic device (e.g., the electronic device 210). In various implementations, the method 300 or portions thereof are performed by a mobile device, such as a smartphone, tablet, or wearable device. In various implementations, the method 300 or portions thereof are performed by a head-mountable device (HMD) including a display. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 302, the method 300 includes displaying, on a display, a virtual agent that is associated with a first viewing frustum. Examples of a virtual agent include various computer-generated entities, such as a person, animal, humanoid, robot, android, anthropomorphic entity, and/or the like. As represented by block 304, the first viewing frustum includes a user avatar associated with a user. The user avatar may provide a graphical representation of the user. For example, with reference to FIGS. 2C and 2D, the virtual agent corresponds to the virtual dog 224, which has a first viewing frustum 228a that includes the user avatar 230 associated with the user 50. The user avatar includes a visual representation of one or more eyes, such as the visual representation of the eye 232 of the user avatar 230 illustrated in FIG. 2D. The visual representation of one or more eyes may correspond to computer-generated eyes (e.g., generic eyes of an individual), or may correspond to the actual eyes of the user overlaid onto the user avatar. For example, an electronic device captures an image of an eye of a user, identifies (e.g., via computer vision) the eye within the image, and overlays the eye onto the user avatar.

As represented by block 306, the method 300 includes obtaining eye tracking data that is indicative of eye behavior associated with an eye of the user. The eye behavior may indicate a current focus position, such as where the user is looking or focusing within a physical environment. For example, with reference to FIG. 2C, the eye tracker 214 determines, based on eye tracking data, that the eye 52 of the user 50 focuses on the first focus position 56a located on the first physical wall 201.

As another example, as represented by block 308, the eye behavior includes a movement of the eye of the user from a first focus position to a second focus position. For example, with reference to FIGS. 2C and 2E, the eye tracker determines that the eye 52 moves from the first focus position 56a to the second focus position 56b. As represented by block 310, in some implementations, the movement includes a saccade, such as described with reference to FIGS. 2E, 2H, and 2J. The saccade may move between the first focus position and the second focus position, such as from an origin point to an object of interest, and back to the origin point. For example, an eye gaze is initially directed to the ground, moves to a virtual dog, and then moves back towards the ground. Other examples of movement of an eye include smooth pursuit, vergence, and vestibulo-ocular movements.

As represented by block 312, the method 300 includes updating the visual representation of one or more eyes based on the eye behavior. For example, with reference to FIGS. 2D and 2F, the electronic device 210 changes the visual representation of the eye 232 from being directed to the first point 236a to the second point 236b, based on a corresponding movement of the eye 52 of the user 50 (illustrated in FIGS. 2C and 2E).

As represented by block 314, in some implementations, the method 300 includes determining, based on the eye tracking data, that the eye behavior indicates an activation request, and activating the virtual agent in response to determining that the eye behavior indicates the activation request. Once activated, the virtual agent may be directed to perform an action. In some implementations, the activation request corresponds to an avatar focusing on a virtual agent. For example, with reference to FIGS. 2F and 2G, in response to determining that the second focus position 236b is on the virtual dog 224, the electronic device 210 activates the virtual dog 224. In some implementations, the activation request corresponds to focusing on a virtual agent for at least a threshold amount of time.

As represented by block 316, the method 300 includes directing the virtual agent to perform a first action based on the updating and scene information associated with the electronic device. For example, the first action includes ahead pose change of the virtual agent, such as the virtual agent moving its head towards a user avatar. As another example, the first action includes the virtual agent emitting an audible sound, such as a virtual dog barking. In some implementations, an electronic device performing the method 300 includes one or more environmental sensors that output environmental data, and the method 300 includes determining the scene information based on the environmental data. Examples of the one or more environmental sensors include an image sensor, a depth sensor, a simultaneous localization and mapping (SLAM) sensor, a visual inertial odometry (VIO) sensor, a global positioning system (GPS) sensor, etc.

In some implementations, the first action corresponds to a first action type when the scene information indicates a first environment type, and the first action corresponds to a second action type when the scene information indicates a second environment type that is different from the first environment type. The second action type is different from the first action type. Examples of the environment type include a virtual reality (VR) environment, augmented reality (AR) environment, mixed reality (MR) environment etc. Other examples of scene information include scene ambience (e.g., a dark and quiet room), information regarding objects that are within the scene, scene location (e.g., outdoors versus indoors), and/or the like. Moreover, the scene information may indicate a map (e.g., a mesh) that indicates a plurality of physical objects and surfaces, such as is determined based on SLAM data, point cloud data, etc. As one example, when the scene information indicates a quiet ambience, the electronic device directs the virtual agent to limit the volume of any sounds that the virtual agent produces (e.g., emits). As another example, when the scene information indicates that a physical object blocks a straight-line path between the virtual agent and a focus position associated with the user's eyes, the electronic device directs the virtual agent to move along a path that avoids the physical object in order to reach the focus position.

As represented by block 318, in some implementations, the first action includes changing an appearance of the one or more virtual eyes. As represented by block 320, in some implementations, changing the appearance of the one or more virtual eyes includes changing the one or more virtual eyes from the first viewing frustum to a second viewing frustum. For example, with reference to FIGS. 2H-2L, the electronic device 210 directs the virtual dog 224 to change the virtual eye 226 from being associated with the first viewing frustum 228a to being associated with the second viewing frustum 228b (including the virtual baseball 222), based on the eye 52 of the user 50 changing focus between the virtual dog 224 and the virtual baseball 222. As another example, changing an appearance of the one or more virtual eyes includes changing the color of one or more virtual eyes, enlarging one or more virtual eyes, shrinking one or more virtual eyes, etc. For example, based on scene information indicating that a virtual dog is outdoors, and based on an eye of a user moving towards a ball, an electronic device directs the virtual dog to enlarge its eyes in order indicate it is excited to play with the ball outdoors.

As represented by block 322, in some implementations, the first action includes a movement of the virtual agent from a first position within an operating environment to a second position within the operating environment. In some implementations, the movement of the virtual agent is based on detecting that the eye of the user maintains focus at a particular focus position for at least a threshold duration. As one example, based on determining that the eye 232 of the user avatar 230 maintains focus at the third point 236c (on the virtual baseball 222) for at least a first threshold duration, the electronic device 210 directs the virtual dog 224 to move towards the virtual baseball 222, as indicated by the first movement line 240 in FIG. 2R. Continuing with this example, the electronic device 210 determines that the eye 232 of the user avatar 230 maintains focus at the third point 236c (on the virtual baseball 222) for at least a second threshold duration, which is longer than the first threshold duration. Based on the second threshold duration, the electronic device 210 directs the virtual dog 224 to bring the virtual baseball 222 to the user avatar 230, as indicated by the second movement line 242 in FIG. 2T. Accordingly, based on maintaining focus on a particular point or region for different lengths of time, an electronic device may direct a virtual agent to perform different corresponding actions.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
   at an electronic device including one or more processors, a non-transitory memory, and a display:
   displaying, on the display, a virtual agent at a first location within a scene;
   obtaining scene information characterizing the scene;
   obtaining eye tracking data that is indicative of first and second eye behaviors associated with an eye of a user of the electronic device, wherein the first eye behavior corresponds to a movement of the eye of the user, and wherein the second eye behavior corresponds to a focus of the eye of the user;
   directing the virtual agent to perform a first action based on the first eye behavior associated with the eye of the user and the scene information; and
   directing the virtual agent to perform a second action based on the second eye behavior associated with the eye of the user and the scene information, wherein the first action is different from the second action.

2. The method of claim 1, further comprising:
   concurrently displaying, on the display, a user avatar at a second location within the scene that is associated with the user and the virtual agent at the first location within the scene that is associated with a first viewing frustum relative to the scene, wherein the user avatar includes a visual representation of one or more eyes, and wherein the user avatar is within the first viewing frustum of the virtual agent; and
   updating the visual representation of the one or more eyes of the user avatar based on the first or second eye behaviors associated with the eye of the user.

3. The method of claim 1, wherein the first eye behavior includes the movement of the eye of the user from a first focus position to a second focus position.

4. The method of claim 3, wherein the movement includes a saccade.

5. The method of claim 4, wherein the saccade is directed to an object of interest.

6. The method of claim 3, wherein directing the virtual agent to perform the first action is in response to detecting the movement of the eye, the method further comprising:
   detecting that the eye of the user maintains focus at the second focus position for at least a threshold duration; and
   in response to detecting that the eye of the user maintains the focus for at least the threshold duration, directing the virtual agent to perform the second action that is different from the first action.

7. The method of claim 1, wherein the virtual agent includes one or more virtual eyes, and wherein the first action includes changing an appearance of the one or more virtual eyes based on the first eye behavior.

8. The method of claim 7, wherein changing the appearance of the one or more virtual eyes includes a movement of the one or more virtual eyes based on a movement of the eye of the user, wherein, after the movement of the one or more virtual eyes, the virtual agent is associated with a second viewing frustum that is different from the first viewing frustum.

9. The method of claim 7, wherein the first eye behavior includes a change from a first focus position to a second focus position, wherein the first action includes changing the one or more virtual eyes from a third focus position to a fourth focus position, and wherein the fourth focus position satisfies a proximity threshold with respect to the second focus position.

10. The method of claim 1, wherein the first action includes a movement of the virtual agent from a first position within an operating environment to a second position within the operating environment.

11. The method of claim 1, wherein the first action includes a head pose change of the virtual agent.

12. The method of claim 1, wherein the first action includes the virtual agent emitting an audible sound.

13. The method of claim 1, wherein:
   the first action corresponds to a first action type when the scene information indicates a first environment type; and
   the first action corresponds to a second action type when the scene information indicates a second environment type that is different from the first environment type, wherein the second action type is different from the first action type.

14. The method of claim 1, further comprising:
- determining, based on the eye tracking data, that the second eye behavior indicates an activation request; and
- activating the virtual agent in response to determining that the second eye behavior indicates the activation request.

15. The method of claim 1, wherein the electronic device includes one or more environmental sensors that output environmental data, the method further comprising determining the scene information based on the environmental data.

16. A non-transitory computer readable storage medium storing one or more programs, the one or more programs comprising instructions, which, when executed by an electronic device including a display, cause the electronic device to:
- display, on the display, a virtual agent at a first location within a scene;
- obtain scene information characterizing the scene;
- obtain eye tracking data that is indicative of first and second eye behaviors associated with an eye of a user of the electronic device, wherein the first eye behavior corresponds to a movement of the eye of the user, and wherein the second eye behavior corresponds to a focus of the eye of the user;
- direct the virtual agent to perform a first action based on the eye behavior associated with the eye of the user and the scene information; and
- direct the virtual agent to perform a second action based on the second eye behavior associated with the eye of the user and the scene information, wherein the first action is different from the second action.

17. The non-transitory computer readable storage medium of claim 16, wherein the first eye behavior includes a movement of the eye of the user from a first focus position to a second focus position.

18. The non-transitory computer readable storage medium of claim 17, wherein the movement includes a saccade directed to an object of interest.

19. The non-transitory computer readable storage medium of claim 17, wherein directing the virtual agent to perform the first action is in response to detecting the movement of the eye, the method further comprising:
- detecting that the eye of the user maintains focus at the second focus position for at least a threshold duration; and
- in response to detecting that the eye of the user maintains the focus for at least the threshold duration, directing the virtual agent to perform the second action that is different from the first action.

20. An electronic device comprising:
- one or more processors;
- non-transitory memory;
- a display; and
- one or more programs stored in the non-transitory memory, which, when executed by the one or more processors, cause the electronic device to:
  - display, on the display, a virtual agent at a first location within a scene;
  - obtain scene information characterizing the scene;
  - obtain eye tracking data that is indicative of first and second eye behaviors associated with an eye of a user of the electronic device, wherein the first eye behavior corresponds to a movement of the eye of the user, and wherein the second eye behavior corresponds to a focus of the eye of the user;
  - direct the virtual agent to perform a first action based on the eye behavior associated with the eye of the user and the scene information; and
  - direct the virtual agent to perform a second action based on the second eye behavior associated with the eye of the user and the scene information, wherein the first action is different from the second action.

* * * * *